(12) United States Patent
Sirotkin et al.

(10) Patent No.: US 10,869,257 B2
(45) Date of Patent: Dec. 15, 2020

(54) APPARATUS, SYSTEM AND METHOD OF CELLULAR-ASSISTED WLAN REGULATORY INFORMATION

(71) Applicant: INTEL IP CORPORATION, Santa Clara, CA (US)

(72) Inventors: Alexander Sirotkin, Giv'on Hachadasha (IL); Ofer Hareuveni, Haifa (IL); Jerome Parron, Fuerth (DE)

(73) Assignee: INTEL IP CORPORATION, Santa Clara, CA (US)

( * ) Notice: Subject to any disclaimer, the term of this patent is extended or adjusted under 35 U.S.C. 154(b) by 69 days.

(21) Appl. No.: 15/746,567

(22) PCT Filed: Dec. 24, 2015

(86) PCT No.: PCT/US2015/000334
§ 371 (c)(1),
(2) Date: Jan. 22, 2018

(87) PCT Pub. No.: WO2017/014717
PCT Pub. Date: Jan. 26, 2017

(65) Prior Publication Data
US 2018/0227828 A1     Aug. 9, 2018

Related U.S. Application Data

(60) Provisional application No. 62/196,181, filed on Jul. 23, 2015.

(51) Int. Cl.
*H04W 48/16* (2009.01)
*H04W 88/06* (2009.01)
(Continued)

(52) U.S. Cl.
CPC .......... *H04W 48/02* (2013.01); *H04W 48/16* (2013.01); *H04W 52/02* (2013.01); *H04W 88/06* (2013.01);
(Continued)

(58) Field of Classification Search
CPC ..... H04W 48/02; H04W 48/16; H04W 52/02; H04W 84/12; H04W 88/06; Y02D 70/00;
(Continued)

(56) References Cited

U.S. PATENT DOCUMENTS 10,021,536 B2 *   7/2018   Morita ................. H04W 72/10
2007/0237121 A1   10/2007  Khandelwal et al.
(Continued)

FOREIGN PATENT DOCUMENTS

CN     101490992     7/2009
CN     101588599     11/2009
(Continued)

OTHER PUBLICATIONS

European Search Report for European Patent Application No. 15899042.4, dated Dec. 12, 2018, 10 pages.
(Continued)

*Primary Examiner* — Andrew Lai
*Assistant Examiner* — M. Mostazir Rahman
(74) *Attorney, Agent, or Firm* — Shichrur & Co.

(57) ABSTRACT

Some demonstrative embodiments include devices, systems and/or methods of cellular-assisted Wireless Local Area Network (WLAN) regulatory information. For example, a User Equipment (UE) may include a WLAN transceiver; a cellular transceiver to receive from an Evolved Node B (eNB) a cellular message including regulatory information indicating one or more regulatory restrictions corresponding to WLAN communications over at least one WLAN frequency band, the regulatory information including at least
(Continued)

an indication on whether or not WLAN active scanning is allowed over the WLAN frequency band; and a controller component configured to, based on the regulatory information, enable or disable the WLAN transceiver to perform a WLAN active scan over the WLAN frequency band.

25 Claims, 5 Drawing Sheets

(51) Int. Cl.
*H04W 48/02* (2009.01)
*H04W 52/02* (2009.01)
*H04W 84/12* (2009.01)

(52) U.S. Cl.
CPC .............. *H04W 84/12* (2013.01); *Y02D 70/00* (2018.01); *Y02D 70/10* (2018.01); *Y02D 70/1224* (2018.01); *Y02D 70/1242* (2018.01); *Y02D 70/1244* (2018.01); *Y02D 70/1246* (2018.01); *Y02D 70/1262* (2018.01); *Y02D 70/14* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/168* (2018.01); *Y02D 70/22* (2018.01); *Y02D 70/26* (2018.01)

(58) Field of Classification Search
CPC ............... Y02D 70/10; Y02D 70/1224; Y02D 70/1242; Y02D 70/1244; Y02D 70/1246; Y02D 70/1262; Y02D 70/14; Y02D 70/142; Y02D 70/144; Y02D 70/146; Y02D 70/162; Y02D 70/164; Y02D 70/168; Y02D 70/22; Y02D 70/26
See application file for complete search history.

(56) References Cited

U.S. PATENT DOCUMENTS

| | | | |
|---|---|---|---|
| 2008/0096501 | A1 | 4/2008 | Salomone et al. |
| 2008/0176581 | A1 | 7/2008 | Abdel-Kader |
| 2008/0259882 | A1* | 10/2008 | Abdel-Kader ........ H04W 48/16 370/338 |
| 2013/0347017 | A1* | 12/2013 | Li ................... H04N 21/42203 725/18 |
| 2014/0211703 | A1 | 7/2014 | Seok |
| 2014/0235175 | A1 | 8/2014 | Fu et al. |
| 2014/0286326 | A1 | 9/2014 | Jang et al. |

FOREIGN PATENT DOCUMENTS

| | | |
|---|---|---|
| CN | 102694813 | 9/2012 |
| CN | 103491615 | 1/2014 |
| KR | 20150000437 | 1/2015 |
| WO | 2014107195 | 7/2014 |
| WO | 2014113103 | 7/2014 |

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
ETSI TS 136 331; V12.3.0 (Sep. 2014); LTE; Evolved Universal Terrestrial Radio Access (E-UTRA); Radio Resource Control (RRC); Protocol specification (3GPP TS 36.331 version 12.3.0 Release 12), 383 pages.
International Search Report and Written Opinion for PCT/US2015/000334, dated Apr. 25, 2016, 19 pages.
3GPP TS 36.463 V0.2.0 (Oct. 2015) Technical Specification; 3rd Generation Partnership Project; Technical Specification Group Radio Access Network; Evolved Universal Terrestrial Radio Access Network (E-UTRAN) and Wireless LAN (WLAN); Xw application protocol (XwAP) (Release 13), Oct. 2015, 66 pages.
3GPP TS 36.300 V11.7.0 (Sep. 2013); Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11) Sep. 2013, 209 pages.
International Preliminary Report on Patentability for PCT/US2015/000334, dated Feb. 1, 2018, 10 pages.
Office Action for Chinese Patent Application No. 201580081895.9, dated Apr. 14, 2020, 10 pages.
Office Action for Chinese Patent Application No. 201580081895.9, dated Oct. 12, 2020, 9 pages.

* cited by examiner

APPARATUS, SYSTEM AND METHOD OF CELLULAR-ASSISTED WLAN REGULATORY INFORMATION

CROSS REFERENCE

This application claims the benefit of, and priority from U.S. Provisional Patent Application No. 62/196,181 entitled "Scanning Optimization in 5 GHz for LTE/WLAN Aggregation (LWA) enabled UEs", filed Jul. 23, 2015, the entire disclosure of which is incorporated herein by reference.

TECHNICAL FIELD

Some embodiments described herein generally relate to cellular-assisted Wireless Local Area Network (WLAN) regulatory information.

BACKGROUND

Communication over some frequency bands, for example, unlicensed frequency bands, and/or one or more frequency channels within the frequency bands, may be restricted according to one or more regulations, e.g., in one or more regulatory domains.

For example, communications over one or more channels of the 5 Gigahertz (GHz) frequency band may be restricted, for example, with respect to indoor and/or outdoor use, transmit power, and/or other restrictions and/or limitations.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
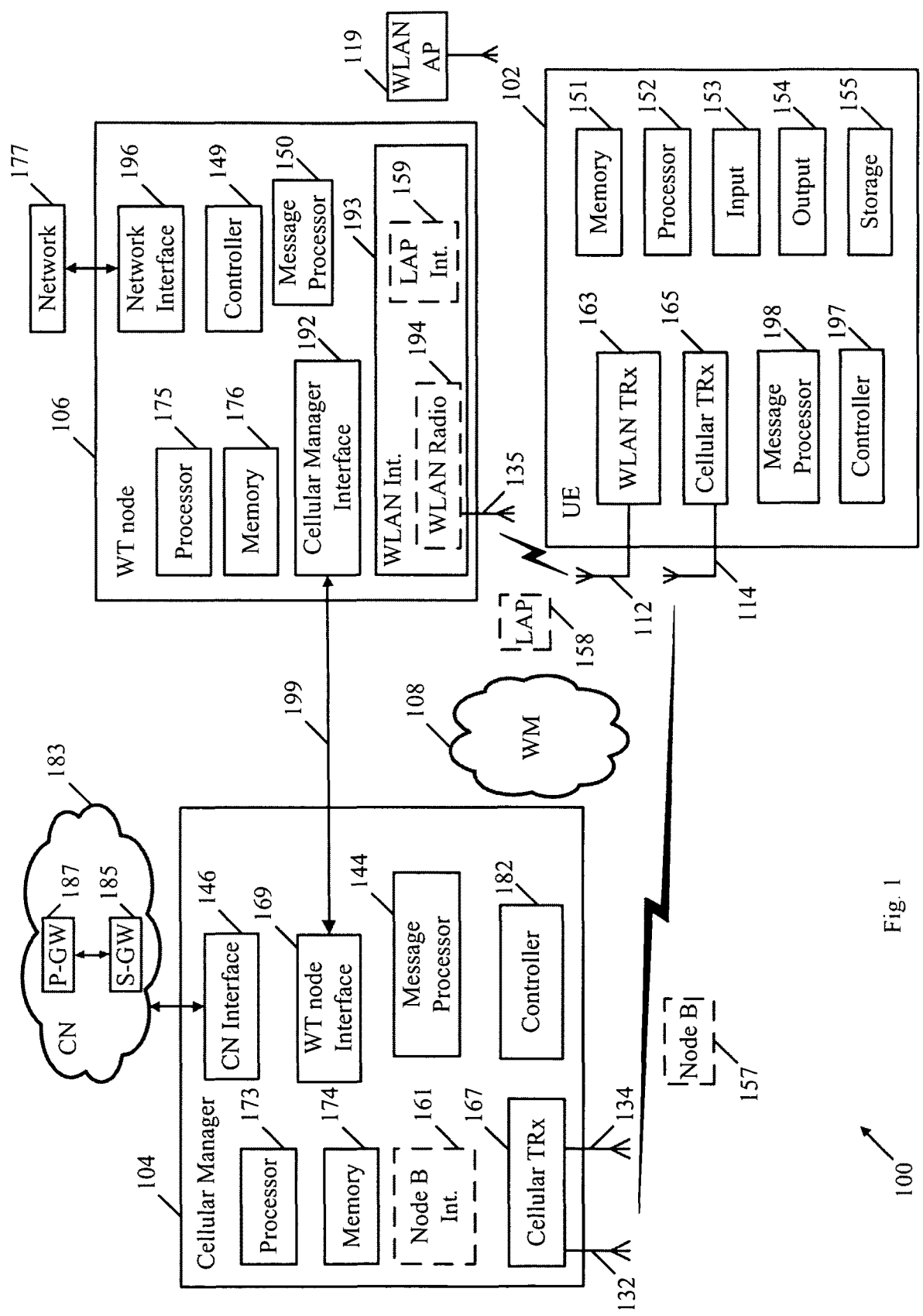
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, a Smartphone device, a server computer, a handheld computer, a handheld device, a Personal Digital Assistant (PDA) device, a handheld PDA device, an on-board device, an off-board device, an Internet of Things (IoT) device, a sensor device, a wearable device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a cellular network, a cellular node, a cellular device, a Wireless Local Area Network (WLAN), a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, vending machines, sell terminals, and the like.

Some embodiments may be used in conjunction with devices and/or networks operating in accordance with existing 3rd Generation Partnership Project (3GPP) and/or Long Term Evolution (LTE) specifications (including 3GPP TS 36.300 ("TS 36.300 *Evolved Universal Terrestrial Radio Access (E-UTRA) and Evolved Universal Terrestrial Radio Access Network (E-UTRAN); Overall description; Stage 2, version 11.7.0 Release 11*", September 2013); 3GPP TS 36.331 (*ETSI TS* 136 331; *V*12.3.0 (2014 September); *LTE; Evolved Universal Terrestrial Radio Access (E-UTRA)*;

Radio Resource Control (RRC); Protocol specification (3GPP TS 36.331 version 12.3.0 Release 12); and/or 3GPP TS 36.463 (3GPP TS 36.463 V0.2.0 (2015 October) Technical Specification; 3rd Generation Partnership Project; Technical Specification Group Radio Access Network; Evolved Universal Terrestrial Radio Access Network (E-UTRAN) and Wireless LAN (WLAN); Xw application protocol (XwAP) (Release 13))) and/or future versions and/or derivatives thereof, devices and/or networks operating in accordance with existing Wireless-Gigabit-Alliance (WGA) specifications (Wireless Gigabit Alliance, Inc WiGig MAC and PHY Specification Version 1.1, April 2011, Final specification) and/or future versions and/or derivatives thereof, devices and/or networks operating in accordance with existing IEEE 802.11 standards (including IEEE 802.11-201 (IEEE 802.11-2012, IEEE Standard for Information technology—Telecommunications and information exchange, between systems Local and metropolitan area networks—Specific requirements Part 11: Wireless LAN Medium Access Control (MAC) and Physical Layer (PHY) Specifications, Mar. 29, 2012); and/or IEEEP802.11REVinc™ (IEEEP802.11REVmc™_D3.0, June 2014, Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications)), and/or future versions and/or derivatives thereof, devices and/or networks operating in accordance with existing IEEE 802.16 standards (IEEE-Std 802.16, 2009 Edition, Air Interface for Fixed Broadband Wireless Access Systems; IEEE-Std 802.16e, 2005 Edition, Physical and Medium Access Control Layers for Combined Fixed and Mobile Operation in Licensed Bands; amendment to IEEE Std 802.16-2009, developed by Task Group m) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one or more types of wireless communication signals and/or systems, for example, Radio Frequency (RF), Frequency-Division Multiplexing (FDM), Orthogonal FDM (OFDM), Single Carrier Frequency Division Multiple Access (SC-FDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wireless Fidelity (Wi-Fi), Wi-Max, ZigBee™, Ultra-Wideband (UWB), Global System for Mobile communication (GSM), second generation (2G), 2.5G, 3G, 3.5G, 4G, Fifth Generation (5G) mobile networks, 3GPP, Long Term Evolution (LTE) cellular system, LTE advance cellular system, High-Speed Downlink Packet Access (HSDPA), High-Speed Uplink Packet Access (HSUPA), High-Speed Packet Access (HSPA), HSPA+, Single Carrier Radio Transmission Technology (1×RTT), Evolution-Data Optimized (EV-DO), Enhanced Data rates for GSM Evolution (EDGE), and the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a dipole antenna, a set of switched beam antennas, and/or the like.

The term "cell", as used herein, may include a combination of network resources, for example, downlink and optionally uplink resources. The resources may be controlled and/or allocated, for example, by a node (also referred to as a "base station"), or the like. The linking between a carrier frequency of the downlink resources and a carrier frequency of the uplink resources may be indicated in system information transmitted on the downlink resources.

Some demonstrative embodiments are described herein with respect to a LTE network. However, other embodiments may be implemented in any other suitable cellular network or system, e.g., a Universal Mobile Telecommunications System (UMTS) cellular system, a GSM network, a 3G cellular network, a 4G cellular network, a 4.5G network, a 5G cellular network, a WiMAX cellular network, and the like.

Some demonstrative embodiments are described herein with respect to a WLAN system, a WiFi system, and/or a WiGig system. However, other embodiments may be implemented in any other suitable non-cellular network.

Some demonstrative embodiments are described herein with respect to a WLAN Termination (WT) node. However, other embodiments may be implemented in any other WLAN controller, WLAN access device, and/or WLAN access manager node and/or interface.

Some demonstrative embodiments may be used in conjunction with a Heterogeneous Network (HetNet), which may utilize a deployment of a mix of technologies, frequencies, cell sizes and/or network architectures, e.g., including cellular, millimeter wave ("mmWave" or "mmW"), and/or the like. In one example, the HetNet may include a radio access network having layers of different-sized cells ranging from large macrocells to small cells, for example, picocells and femtocells. Other embodiments may be used in conjunction with any other suitable wireless communication network.

Other embodiments may be used in conjunction with any other suitable wireless communication network.

Reference is now made to FIG. 1, which schematically illustrates a block diagram of a system 100, in accordance with some demonstrative embodiments.

As shown in FIG. 1, in some demonstrative embodiments, system 100 may include one or more wireless communication devices capable of communicating content, data, information and/or signals via one or more wireless mediums (WM) 108. For example, system 100 may include at least one User Equipment (UE) 102 capable of communicating with one or more wireless communication networks, e.g., as described below.

Wireless mediums 108 may include, for example, a radio channel, a cellular channel, an RF channel, a WiFi channel, an IR channel, and the like. One or more elements of system 100 may optionally be capable of communicating over any suitable wired communication links.

In some demonstrative embodiments, system 100 may include at least one cellular manager 104 to manage communication of a cellular network, e.g., as described below.

In some demonstrative embodiments, cellular manager 104 may include, may operate as, and/or may perform the functionality of, an Evolved Node B (eNB). For example, cellular manager 104 may be configured to perform radio resource management (RRM), radio bearer control, radio admission control (access control), connection mobility management, resource scheduling between UEs and eNB radios, e.g., Dynamic allocation of resources to UEs in both uplink and downlink, header compression, link encryption of user data streams, packet routing of user data towards a destination, e.g., another eNB or an Evolved Packet Core (EPC), scheduling and/or transmitting paging messages, e.g., incoming calls and/or connection requests, broadcast information coordination, measurement reporting, and/or any other operations, communications, and/or functionality.

In other embodiments, cellular manager 104 may include any other functionality and/or may perform the functionality of any other cellular node, network controller, base station or any other node or network device.

In one example, cellular manager 104 may be part of a UMTS. According to this example, cellular manager 104 may perform the functionality of a Radio Network Controller (RNC), which may control a plurality of Node B devices 157. For example, the node B may be configured to communicate directly with UEs, e.g., including UE 102, for example, using a Wideband Code Division Multiple Access (WCDMA) and/or Time Division Synchronous Code Division Multiple Access (TD-SCDMA) air interface technology. The RNC may include, for example, a UMTS RNC configured to control the Node B devices 157.

In some demonstrative embodiments, system 100 may include a WLAN Termination (WT) node 106, which may be configured to terminate a WLAN network interface, e.g., as described herein.

Some demonstrative embodiments are described below with respect to a WT node to terminate a WLAN network interface. In other; embodiments and additional or alternative termination node may be used to terminate a network interface of any other non-cellular RAT network, for example, a Bluetooth network, a millimeter wave (mmWave) network, and/or any other network, e.g., in addition to or instead of the WLAN network.

In some demonstrative embodiments, WT node 106 may be configured to manage access to a non-cellular network 107, for example, a WLAN, e.g., a Service Set (SS), a Basic Service Set (BSS), and Extended Service Set, a Homogenous Extended Service Set (HESS), and the like.

In some demonstrative embodiments, one or more functionalities of WT node 106 may be implemented, for example, in the form of, or as part of, a WLAN access device, for example, as part of a WLAN Access Point (AP), or a WLAN Access Controller (AC), as part of another device, or as a standalone device.

In other embodiments, WT node 106 may include any other functionality and/or may perform the functionality of any other device capable of controlling and/or managing WLAN radio access to one or more wired networks.

In one example, WT bode 106 may include, operate as, and/or perform the functionality of, an AP, e.g., configured to communicate directly with UE 102 via a WLAN link.

In another example, WT bode 106 may include, operate as, and/or perform the functionality of, an AC. According to this example, WT node 106 may control a plurality of AP devices, e.g., including Lightweight Access Point (LAP) devices 158.

In some demonstrative embodiments, UE 102 may include, for example, a Mobile Device (MD), a Station (STA), a mobile computer, a laptop computer, a notebook computer, a tablet computer, an Ultrabook™ computer, an Internet of Things (IoT) device, a wearable device, a sensor device, a mobile internet device, a handheld computer, a handheld device, a storage device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a video device, an audio device, an A/V device, a gaming device, a media player, a Smartphone, or the like.

In some demonstrative embodiments, UE 102, cellular manager 104 and/or WT node 106 may include one or more communication interfaces to perform communication between UE 102, cellular manager 104, WT node 106 and/or with one or more other wireless communication devices, e.g., as described below.

Some demonstrative embodiments include an interface 199 (also referred to as "the access device interface", "the horizontal interface", "the "Xw interface", "the X2-W interface" or "the cellular/WLAN interface"), which may include circuitry and/or logic configured to interface, e.g., directly or indirectly, between a cellular network element, e.g., cellular manager 104, and a WLAN element, e.g., WT node 106, as described in detail below.

In some demonstrative embodiments, interface 199 may be implemented to interface between an eNB and a WT node, e.g., as described below. However, in other embodiments, the cellular/WLAN interface 199 may be implemented to directly interface between any other cellular device and any other WLAN device. In one example, the cellular/WLAN interface 199 may be implemented to directly interface between an eNB and a WLAN AP or WLAN AC. In another example, the cellular/WLAN interface 199 may be implemented to directly interface between a UMTS RNC and a WT node. In another example, the cellular/WLAN interface 199 may be implemented to directly interface between a UMTS RNC and a WLAN AP or AC.

In some demonstrative embodiments, interface 199 may be utilized to enhance and/or increase the efficiency of interworking, integration and/or management of the cellular and WLAN radio access technologies.

In some demonstrative embodiments, interface 199 may be configured to perform and/or support one or more aggregation operations and/or functionalities, for example, to transfer traffic, e.g., in addition to transferring control plane information.

In some demonstrative embodiments, interface 199 may be utilized to improve efficiency of resource management, to provide efficient load balancing, and/or to improve mobility between Radio Access Technology (RAT) networks.

In some demonstrative embodiments, cellular manager 104 may include an interface ("Core Network (CN) interface") 146, e.g., a vertical interface, including circuitry and/or logic configured to communicate with one or more elements of a CN 183, e.g., an Evolved Packet Core (EPC).

In some demonstrative embodiments, CN interface 146 may include an S1 vertical interface configured to communicate between cellular manager 104 and a Serving Gateway (S-GW) 185 according to an S1 protocol, e.g., if cellular manager 104 performs the functionality of an eNB. According to this example, S-GW 187 may interface between cellular manager 104 and a Packet Data Network (PDN) Gateway (P-GW) 187.

In other embodiments, CN interface 146 may include any other vertical interface with one or more elements of CN 183. For example, cellular manger 104 may perform the functionality of an RNC, e.g., in a UMTS system. According to this example, CN interface 146 may include an Interface Unit Circuit Switch (Iu-CS) interface and/or an Interface Unit Packet Switch (Iu-PS) interface, to interface between the RNC and one or more packet-switched or circuit-switched CN elements.

In some demonstrative embodiments, cellular manager 104 may include an interface including circuitry and/or logic to communicate user plane traffic, directly or indirectly, between CN 183 and UE 102.

In some demonstrative embodiments, cellular manager 104 may communicate the user plane traffic directly with UE 102, for example, if cellular manager 104 performs the functionality of an eNB. According to these embodiments, cellular manager 104 may include an air interface, for example, a cellular transceiver (TRx) 167, including circuitry and/or logic configured to communicate with UE 102 via a cellular link.

In other embodiments, cellular manager 104 may communicate the user plane traffic with UE 102 via Node B 157, e.g., if cellular manager 104 performs the functionality of an RNC. According to these embodiments, cellular manager 104 may include a Node B interface 161 to communicate between the RNC and Node B 157. For example, Node B interface 161 may include an Interface Unit b (Iub).

In some demonstrative embodiments, cellular manager 104 may include a WT node interface 169 (also referred to as "WLAN control interface") including circuitry and/or logic configured to communicate with WT node 106 and/or with one or more WLAN stations (STAB), e.g., as described below. In one example, interface 169 may include an AP interface, e.g., if WT node 106 performs the functionality of an AP. In another example, interface 169 may include an AC interface, e.g., if WT node 106 performs the functionality of an AC. In another example, interface 169 may include any other non-cellular RAT interface to communicate with a node of a non-cellular RAT network.

In some demonstrative embodiments, WT node 106 may include a cell manager interface ("the cellular interface") 192 including circuitry and/or logic configured to communicate with cellular manager 104. In one example, interface 192 may include an eNB interface, e.g., if cellular manager 104 performs the functionality of an eNB. In another example, interface 192 may include a RNC interface, e.g., if cellular manager 104 performs the functionality of a RNC.

In some demonstrative embodiments, interfaces 169 and 192 may be configured to communicate between cellular manager 104 and WT node 106 via a direct link of interface 199.

In some demonstrative embodiments, interface 199 may include a Point to Point (P2P) link, e.g., as described below.

In some demonstrative embodiments, interface 199 may be implemented by any wired and/or wireless link, e.g., using any suitable, Physical Layer (PHY) components and/or protocols.

In some demonstrative embodiments, WT node 106 may include a network interface 196 including circuitry and/or logic configured to communicate network traffic with a wired network 177, e.g., the Internet and/or any other network.

In some demonstrative embodiments, WT node 106 may include a WLAN interface 193 including circuitry and/or logic configured to communicate the network traffic and/or any other traffic with UE 102 via a WLAN, directly or indirectly.

In some demonstrative embodiments, WT node 106 may communicate directly with UE 102 via WLAN link, for example, if WT node 106 includes, operates as, or performs the functionality of, an AP. According to these embodiments, WLAN interface 193 may include a WLAN radio 194 including circuitry and/or logic configured to communicate the network traffic and/or any other traffic directly with UE 102, e.g., via a WLAN link between WT node 106 and UE 102, for example, if WT node 106 includes, operates as, or performs the functionality of, an AP.

In some demonstrative embodiments, WT node 106 may indirectly communicate with UE 102, for example, if WT node 106 performs the functionality of an AC, or if WT node 106 is an entity, which is separate from the WLAN AC or WLAN AP. According to these embodiments, WLAN interface 193 may include, for example, an AP interface, e.g., a LAP interface 159, to communicate the network traffic and/or any other traffic with LAP 158.

In some demonstrative embodiments, WLAN interface 193 may include any other additional or alternative interfaces to directly and/or indirectly communicate via the WLAN.

In some demonstrative embodiments, UE 102 may include a non-cellular RAT transceiver (TRx), for example, a WLAN TRx 163, including circuitry and/or logic configured to communicate with a WLAN device, e.g., with WT node 106 and/or with LAP 158, via the WLAN link. Some embodiments are described below with respect to a UE, e.g., UE 102, including a WLAN TRx to communicate over a WLAN. In other embodiments, the UE may include any additional or alternative non-cellular RAT TRx, e.g., a Bluetooth TRx and/or any other TRx, to communicate over any additional or alternative non-cellular RAT network.

In some demonstrative embodiments, UE 102 may include a cellular transceiver (TRx) 165 including circuitry and/or logic configured to communicate with a cellular network, for example, via a cellular device, e.g., cellular manager 104 and/or Node B 157, via the cellular link.

In some demonstrative embodiments, WLAN TRx 163, cellular TRx 165, cellular TRx 167 and/or WLAN radio 194 may include one or more wireless transmitters, receivers and/or transceivers including circuitry and/or logic to process, encode, decode, send and/or receive wireless communication signals, RF signals, frames, blocks, transmission streams, packets, messages, data items, and/or data.

In some demonstrative embodiments, WLAN TRx 167 and/or WLAN radio 194 may include one or more wireless receivers (Rx) including circuitry and/or logic to receive wireless communication signals, RF signals, frames, blocks, transmission streams, packets, messages, data items, and/or data; and/or one or more wireless transmitters (Tx) including circuitry and/or logic to send wireless communication signals, RF signals, frames, blocks, transmission streams, packets, messages, data items, and/or data. For example, WLAN TRx 167 and/or WLAN radio 194 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative embodiments, cellular TRx 167 and/or cellular TRx 165 may include a multiple input multiple output (MIMO) transmitters receivers system (not shown), which may be capable of performing antenna beamforming methods, if desired. In other embodiments, cellular TRx 167 and/or cellular TRx 165 may include any other transmitters and/or receivers.

In some demonstrative embodiments, cellular TRx 167 and/or cellular TRx 165 may include LTE, WCDMA and/or TD-SCDMA modulator and/or demodulator circuitry (not shown) configured to modulate and/or demodulate downlink signals to be communicated over downlink channels, e.g., between cellular manager 104 and UE 102, and/or uplink signals to be communicated over uplink channels, e.g., between UE 102 and cellular manager 104. In other embodiments, cellular TRx 167 and/or cellular TRx 165 may include any other modulators and/or demodulators.

In some demonstrative embodiments, cellular TRx 167 and/or cellular TRx 165 may include a turbo decoder and/or a turbo encoder (not shown) including circuitry and/or logic for encoding and/or decoding data bits into data symbols, if desired. In some demonstrative embodiments, cellular TRx 167 and/or cellular TRx 165 may include OFDM and/or SC-FDMA modulators and/or demodulators (not shown) configured to communicate OFDM signals over downlink (DL) channels, and/or SC-FDMA signals over uplink (UL) channels.

In some demonstrative embodiments, UE 102 may establish a WLAN link with a WLAN AP 119. For example, WLAN TRx 163 may perform the functionality of one or more STAs, e.g., one or more WiFi STAs, WLAN STAs, and/or DMG STAs. The WLAN link may include an uplink and/or a downlink. The WLAN downlink may include, for example, a unidirectional link from the WLAN AP 119 to the one or more STAs. The uplink may include, for example, a unidirectional link from a STA to the WLAN AP 119.

In some demonstrative embodiments, WT node 106 may be configured to perform the functionality of a WLAN AP 119, for example, in a collocated LTE/WLAN aggregation implementation.

In some demonstrative embodiments, WT node 106 may be configured to control and/or communicate with one or more WLAN APs 119, e.g., a plurality of WLAN APs 119.

In some demonstrative embodiments, UE 102, cellular manager 104, and/or WT node 106, may include, or may be associated with, one or more antennas. In one example, WLAN TRx 163 and/or cellular TRx 165 may be associated with at least two antennas, e.g., antennas 112 and 114, or any other number of antennas, e.g., one antenna or more than two antennas; cellular TRx 167 may be associated with at least two antennas, e.g., antennas 132 and 134, or any other number of antennas, e.g., one antenna or more than two antennas; and/or WLAN radio 194 may be associated with one or more antennas 135.

In some demonstrative embodiments, antennas 112, 114, 132, 134 and/or 135 may include any type of antennas suitable for transmitting and/or receiving wireless communication signals, blocks, frames, transmission streams, packets, messages and/or data. For example, antennas 112, 114, 132, 134 and/or 135 may include any suitable configuration, structure and/or arrangement of one or more antenna elements, components, units, assemblies and/or arrays. For example, antennas 112, 114, 132, 134 and/or 135 may include a phased array antenna, a dipole antenna, a single element antenna, a set of switched beam antennas, and/or the like.

In some embodiments, antennas 112, 114, 132, 134 and/or 135 may implement transmit and receive functionalities using separate transmit and receive antenna elements. In some embodiments, antennas 112, 114, 132, 134 and/or 135 may implement transmit and receive functionalities using common and/or integrated transmit/receive elements.

In some demonstrative embodiments, cellular manager 104 may include at least one controller component 182, UE 102 may include at least one controller component 197, and/or WT node 106 may include at least one controller component 149. Controllers 182, 197, and/or 149 may be configured to trigger one or more communications, may generate and/or trigger communication of one or more messages and/or transmissions, and/or may perform one or more functionalities, operations and/or procedures, e.g., as described below.

In some demonstrative embodiments, controllers 182, 197, and/or 149 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 182, 197, and/or 149, respectively. Additionally or alternatively, one or more functionalities of controllers 182, 197, and/or 149 may be implemented by logic, which may be executed by a machine and/or one or more processors, e.g., as described below.

In one example, controller 182 may include circuitry and/or logic, for example, one or more processors including circuitry and/or logic configured to cause, request and/or trigger cellular manager 104 to perform one or more operations, communications and/or functionalities, e.g., as described herein. In one example, controller 197 may include circuitry and/or logic, for example, one or more processors including circuitry and/or logic, configured to cause, request and/or trigger UE 102 to perform one or more operations, communications and/or functionalities, e.g., as described herein. In one example, controller 149 may include circuitry and/or logic, for example, one or more processors including circuitry and/or logic, configured to cause, request and/or trigger WT node 106 to perform one or more operations, communications and/or functionalities, e.g., as described herein.

In some demonstrative embodiments, cellular manager 104 may include a message processor 144 configured to generate, process and/or access one or messages communicated by cellular manager 104. In one example, message processor 144 may be configured to generate one or more messages to be transmitted by cellular manager 104, and/or message processor 144 may be configured to access and/or to process one or more messages received by cellular manager 104, e.g., as described below.

In some demonstrative embodiments, UE 102 may include a message processor 198 configured to generate, process and/or access one or messages communicated by UE 102. In one example, message processor 198 may be configured to generate one or more messages to be transmitted by UE 102, and/or message processor 198 may be configured to access and/or to process one or more messages received by UE 102, e.g., as described below.

In some demonstrative embodiments, WT node 106 may include a message processor 150 configured to generate, process and/or access one or messages communicated by WT node 106. In one example, message processor 150 may be configured to generate one or more messages to be transmitted by WT node 106, and/or message processor 150 may be configured to access and/or to process one or more messages received by WT node 106, e.g., as described below.

In some demonstrative embodiments, message processors 144, 198 and/or 150 may include circuitry, e.g., processor circuitry, memory circuitry, Media-Access Control (MAC) circuitry, Physical Layer (PHY) circuitry, and/or any other circuitry, configured to perform the functionality of message processors 144, 198 and/or 150. Additionally or alternatively, one or more functionalities of message processors 144, 198 and/or 150 may be implemented by logic, which may be executed by a machine and/or one or more processors, e.g., as described below.

In some demonstrative embodiments, at least part of the functionality of message processor 144 may be implemented as part of cellular TRx 167 and/or WT node interface 169; at least part of the functionality of message processor 198 may be implemented as part of cellular TRx 165 and/or WLAN TRx 163; and/or at least part of the functionality of message processor 150 may be implemented as part of interface 192 and/or interface 193.

In some demonstrative embodiments, at least part of the functionality of message processor 144 may be implemented as part of controller 182, at least part of the functionality of message processor 198 may be implemented as part of controller 197, and/or at least part of the functionality of message processor 150 may be implemented as part of controller 149.

In other embodiments, at least part of the functionality of message processor 144 may be implemented as part of any other element of cellular manager 104, at least part of the functionality of message processor 198 may be implemented as part of any other element of UE 102, and/or at least part of the functionality of message processor 150 may be implemented as part of any other element of WT node 106.

In some demonstrative embodiments, at least part of the functionality of controller 197, and/or message processor 198 may be implemented by an integrated circuit, for example, a chip, e.g., a System on Chip (SoC). In one example, the chip or SoC may be configured to perform one or more functionalities of cellular transceiver 165 and/or WLAN TRx 163. For example, the chip or SoC may include one or more elements of controller 197, message processor 198, and/or one or more elements of cellular transceiver 165 and/or WLAN TRx 163. In one example, controller 197, message processor 198, cellular transceiver 163, and WLAN TRx 163 may be implemented as part of the chip or SoC. In other embodiments, controller 197, message processor 198, cellular transceiver 165 and/or WLAN TRx 163 may be implemented by one or more additional or alternative elements of UE 102.

In some demonstrative embodiments, at least part of the functionality of controller 182 and/or message processor 144 may be implemented by an integrated circuit, for example, a chip, e.g., a System on Chip (SoC). In one example, the chip or SoC may be configured to perform one or more functionalities of cellular transceiver 167 and/or WT node interface 169. For example, the chip or SoC may include one or more elements of controller 182, message processor 144, and/or one or more elements of cellular transceiver 167 and/or WT node interface 169. In one example, controller 182, message processor 144, cellular transceiver 167, and WT node interface 169 may be implemented as part of the chip or SoC. In other embodiments, controller 182, message processor 144, cellular transceiver 167 and/or WT node interface 169 may be implemented by one or more additional or alternative elements of cellular manager 104.

In some demonstrative embodiments, at least part of the functionality of controller 149 and/or message processor 150 may be implemented by an integrated circuit, for example, a chip, e.g., a System on Chip (SoC). In one example, the chip or SoC may be configured to perform one or more functionalities of WLAN interface 193 and/or cellular manager interface 192. For example, the chip or SoC may include one or more elements of controller 149, message processor 150, and/or one or more elements of WLAN interface 193 and/or cellular manager interface 192. In one example, controller 149, message processor 150, WLAN interface 193, and cellular manager interface 192 may be implemented as part of the chip or SoC. In other embodiments, controller 149, message processor 150, WLAN interface 193 and/or cellular manager interface 192 may be implemented by one or more additional or alternative elements of WT node 106.

In some demonstrative embodiments, cellular manager 104, WT node 106, and/or UE 102 may also include, for example, one or more of a processor, an input unit, an output unit, a memory unit, and/or a storage unit. For example, cellular manager 104 may include a processor 173 and/or a memory 174; WT node 106 may include a processor 175 and/or a memory 176; and/or UE 102 may include a memory 151, a processor 152, an input unit 153, an output unit 154, and/or a storage unit 155. UE 102, cellular manager 104 and/or WT node 106 may optionally include other suitable hardware components and/or software components. In some demonstrative embodiments, some or all of the components of one or more of UE 102, cellular manager 104 and/or WT node 106, may be enclosed in a common housing or packaging, and may be interconnected or operably associated using one or more wired or wireless links. In other embodiments, components of one or more of UE 102, cellular manager 104 and/or WT node 106 may be distributed among multiple or separate devices.

In some demonstrative embodiments, processors 173, 175 and/or 152 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. For example, processor 173 may execute instructions, for example, of an Operating System (OS) of cellular manager 104 and/or of one or more suitable applications; processor 175 may execute instructions of an OS of WT node 106 and/or of one or more suitable applications; and/or processor 152 may execute instructions of an OS of UE 102 and/or of one or more suitable applications.

In some demonstrative embodiments, input unit 153 may include, for example, a keyboard, a keypad, a mouse, a touch-screen, a touch-pad, a track-ball, a stylus, a microphone, or other suitable pointing device or input device. Output unit 154 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 174, 176 and/or 151 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 155 includes, for example, a hard disk drive, a floppy disk drive, a Compact Disk (CD) drive, a CD-ROM drive, a DVD drive, or other suitable removable or non-removable storage units. For example, memory unit 174 may store data processed by cellular manager 104; memory unit 151 may store data processed by UE 102; and/or memory unit 176 may store data processed by WT node 106.

In some demonstrative embodiments, UE 102 may be configured to utilize a cellular connection, e.g., a LTE cellular connection or any other cellular connection, to communicate with cellular manager 104, and a WLAN connection, e.g., a Wireless-Fidelity (WiFi) connection, a mmWave connection, a wireless P2P connection, or any other WLAN connection, to communicate with a WLAN AP 119, which may be, for example, connected to, implemented by, and/or controlled by WT node 106.

In some demonstrative embodiments, one or more elements of system 100 may perform the functionality of a HetNet, which may utilize a deployment of a mix of technologies, frequencies, cell sizes and/or network architectures, for example, including cellular, WLAN, and/or the like.

For example, the HetNet may be configured to provide a service through a first wireless communication environment, e.g., a cellular network, and to maintain the service when switching to another communication environment, e.g., WLAN. The HetNet architecture may enable utilizing a mixture of wireless communication environments, e.g., a WLAN environment and a cellular environment for example, to optimally respond to rapid changes in customer demand, reduce power consumption, reduce cost, increase efficiency and/or achieve any other benefit.

In one example, system 100 may utilize a Multi-tier, Multi-Radio Access Technology (Multi-RAT) Het-Net architecture, including a tier of small cells, e.g., pico, femto, relay stations, WiFi APs, and the like, overlaid on top of a macro cellular deployment to augment network capacity.

In another example, system 100 may utilize Multi-RAT small cells integrating multiple radios such as WiFi and 3GPP air interfaces in a single infrastructure device.

In other embodiments, system 100 may implement any other architecture and/or deployment.

In some demonstrative embodiments, UE 102 and/or cellular manager 104 may be configured to establish one or more Evolved UMTS Terrestrial Radio Access Network (EUTRAN) Radio Access Bearers (E-RABs) between UE 102 and S-GW 185, e.g., via cellular manager 104.

In some demonstrative embodiments, UE 102, cellular manager 104 and/or WT node 106 may be configured to communicate according to a LTE/WLAN protocol aggregation (LWA) scheme, e.g., as described below.

In some demonstrative embodiments, the LTE/WLAN protocol stack aggregation may be configured to enable LTE interworking with a WLAN protocol stack.

In some demonstrative embodiments, the LTE/WLAN protocol stack aggregation may be configured to anchor WLAN mobility at the cellular manager 104.

In some demonstrative embodiments, cellular manager 104 and/or WT node 106 may be configured according to a network architecture of a non-collocated LTE/WLAN aggregation, e.g., in which cellular manager 104 and WT node 106 are not collocated as part of an integrated device and/or in which interface 199 is not an internal interface.

In some demonstrative embodiments, cellular manager 104 and/or WT node 106 may be configured according to a network architecture of a collocated LTE/WLAN aggregation, e.g., in which cellular manager 104 and WT node 106 may be collocated as part of an integrated device and/or in which interface 199 is an internal interface.

In some demonstrative embodiments, there may be one or more restrictions and/or constraints, for example, regulatory restrictions and/or constraints, with respect to communication over one or more WLAN frequency bands and/or channels, e.g., as described below.

In some demonstrative embodiments, WT node 106, cellular manager 104, and/or UE 102 may be configured according to a cellular-assisted scheme, which may be configured to enable cellular manager 104 to provide UE 102 with information pertaining to the restrictions and/or constraints for communicating over one or more WLAN frequency bands and/or channels, e.g., as described below.

In some demonstrative embodiments, UE 102 may be configured to communicate over one or more WLAN frequency bands, for example, one or more unlicensed frequency bands, for example, unlicensed frequency bands defined according to the Federal Communication Commission (FCC) regulations, and/or any other frequency bands according to any other additional or alternative regulations.

In some demonstrative embodiments, UE 102 may be configured to communicate over one or more WLAN frequency bands, which may be restricted, for example, according to one or more regulatory restrictions.

In some demonstrative embodiments, UE 102 may be configured to communicate over one or more channels of a 5 Gigahertz (GHz) frequency band, and/or any other frequency band, which may be subject to regulatory restrictions.

Some demonstrative embodiments are described herein with respect to communications over a 5 GHz frequency band. However, other embodiments may be implemented with respect to any other additional or alternative WLAN frequency band.

In some demonstrative embodiments, communications over one or more channels of the 5 GHz frequency band may be restricted according to one or more regulatory constraints.

In some demonstrative embodiments, in some regulatory domains, e.g., countries, a device operating on one or more predefined channels of the 5 GHz frequency band may be required to perform one or more procedures and/or mechanisms, for example, dynamic frequency selection (DFS) and/or transmit power control (TPC).

In some demonstrative embodiments, for example, in accordance with an IEEE 802.11 Specification, regulations that apply to the 5 GHz band in most regulatory domains require Radio Local Are Networks (RLANs) operating in the 5 GHz band to implement a mechanism to avoid co-channel operation with radar systems, e.g., the DFS mechanism and/or the TPC mechanism.

In some demonstrative embodiments, in some regulatory domains, e.g., countries, a device operating on one or more predefined channels of the 5 GHz frequency band may be restricted to performing one or more operations and/or procedures and/or may not be allowed to perform one or more types of communication and/or procedures.

In some demonstrative embodiments, in some countries one or more frequency channels of the 5 GHz frequency band may be restricted for use in an indoor location. For example, according to the FCC regulations, an Unlicensed National Information Infrastructure (UNII) frequency band at a range of channels of 5150-5250 MHz (UNII1) may be restricted for indoor use only.

In some demonstrative embodiments, UE 102 may not be allowed to communicate over the UNII1 frequency band if UE 102 is located in an outdoor location; and/or UE 102 may be allowed to communicate over the UNII1 frequency band only if UE 102 is located in an indoor location, e.g., according to the FCC regulations.

In some demonstrative embodiments, in some countries or domains one or more frequency channels of the 5 GHz frequency band may be restricted to communications at a very low Transmit (Tx) power, for example, communications by Short Range Devices (SRD).

In some demonstrative embodiments, some regulatory restrictions may restrict, prohibit and/or disable UE 102 from performing one or more active scanning operations to detect WLAN APs over one or more frequency channels.

In some demonstrative embodiments, some regulatory restrictions may enable UE 102 to perform only one or more passive scanning operations to detect WLAN APs.

In some demonstrative embodiments, due to the regulatory restrictions, a device, e.g., UE 102, which may, for example, be configured by hardware to operate in a plurality of domains, e.g., worldwide or in some countries or, regions, may be required to adopt emission channels and/or Tx power, for example, per a current regulatory domain, e.g., country or region.

In some demonstrative embodiments, regulatory restrictions for 5 GHz channel allowance may vary between domains, e.g., with limited overlap, for example, unlike one or more other frequency bands, for example, the 2.4 GHz frequency band, in which channels 1-11 are unrestricted or "open" worldwide. As a result, a device, which is not able to determine the local regulatory constraints, may be required to perform only passive scanning, e.g., on most or all 5 GHz channels, and to switch to an active scan, for example, only after hearing a WLAN AP on a specific channel.

In some demonstrative embodiments, due to the existence of channels defined as "Indoor only" and/or SRD channels in some regulatory domains, a mobile device may be required to passively scan to identify a WLAN AP in one or more channels, and to parse regulatory information received in an AP beacon, for example, before being able to communicate over one or more channels of the 5 GHZ frequency band.

In some demonstrative embodiment, some regulatory constraints, e.g., the regulatory constraints over the 5 GHz band, may result in a restriction on a mobile device operating in certain 5 GHz bands, e.g., in one or more certain countries, to only be allowed to use passive scanning to detect suitable WLAN APs.

In some demonstrative embodiments, a passive scanning procedure may last a long time, may consume increased power and/or may delay one or more actions and/or communications by the mobile device, e.g., compared to an active scanning procedure. For example, passive scanning may delay an ability of performing LTE/WLAN Aggregation (LWA) activation for a UE, intra-WLAN mobility of a UE, and/or any other additional or alternative operations.

In some demonstrative embodiments, a UE may be forced to use passive scanning when operating in one or more channels of the 5 GHz frequency band, for example, if the UE is not able to determine whether or not an active scan is allowed over the one or more channels of the 5 GHz frequency band, e.g., according to regulatory restrictions in a domain of the UE. Forcing the UE to always use passive scanning in the one or more channels of the 5 GHz frequency band may result in unnecessary power consumption by the UE, and/or degraded LTE/WLAN offload performance, e.g., in terms of a longer WLAN detection delay, which may result in a longer LWA activation delay, and/or intra-WLAN LWA mobility delay.

In some demonstrative embodiments, a UE, e.g., UE 102, may be allowed to determine and/or select whether the UE may meet the regulatory requirements, and/or to decide whether or not active scanning is allowed according to the regulatory constraints. For example, according to the IEEE 802.11-2012 Specification, a STA may operate when the Spectrum Management bit is 0, if the STA determines that it is in a regulatory domain that does not require DFS or determines that it meets regulatory requirements even if DFS is not employed. For example, potential processes for determining the regulatory domain include receiving a country indication in the Beacon frame, user confirmation, or configuration information within the device. For example, potential processes to enable regulations to be met even if DFS is not employed include independently detecting radar and ceasing operation on channels on which radar is detected.

In some demonstrative embodiments, in some implementations, use cases, deployments, and/o scenarios cellular manager 104 may be provided with, may have access to, and/or may be capable of determining, one or more regulatory restrictions corresponding to one or more WLAN frequency bands.

In one example, cellular manager 104 may be provided with, may have access to, and/or may be capable of determining, one or more regulatory restrictions corresponding to one or more WLAN frequency bands utilized by UE 102, for example, when WLAN usage of UE 102 is controlled by a 3GPP network, e.g. when UE supports LTE/WLAN Aggregation (LWA).

In some demonstrative embodiments, the connection of UE 102 to a cellular network, for example, an LTE network, e.g., via a primary cell controlled by cellular manager 104, may be exploited to provide to UE 102 regulatory information, e.g., regulatory information which may be related at least to scanning, for example, via LTE from an eNB, e.g., cellular manager 104.

In some demonstrative embodiments, UE 102 may be configured, for example, to select, based on the regulatory information, whether or not to use active scanning over one or more frequency bands supported by UE 102, e.g. the 5 GHz frequency band.

In some demonstrative embodiments, cellular manager 104 may be configured to provide to UE 102 regulatory information corresponding to the one or more WLAN frequency bands utilized by and/or supported by UE 102, e.g., as described below.

In one example, cellular manager 104 may be configured to provide to UE 102 information related to scanning, e.g., information indicating whether active scanning is allowed in one or more frequency bands and/or frequency channels, e.g., one or more channels of the 5 GHz frequency band, for example, via one or more cellular messages, e.g., via LTE signaling.

Some demonstrative embodiments are described herein with respect to a cellular manager, e.g., cellular manager 104, providing to a UE, e.g., UE 102, regulatory information corresponding to a WLAN frequency band, for example, according to a LWA scheme, e.g., a 3GPP Release 13 (Rel-13) LWA scheme. However, in other embodiments, a cellular manager, e.g., cellular manager 104, may be configured to provide to a UE, e.g., UE 102, regulatory information corresponding to a WLAN frequency band, for example, according to any other additional or alternative scheme, deployment, implementation, use case, and/or architecture, for example, a WLAN/3GPP interworking enhancement, and/or a 3GPP/WLAN interworking scheme, according to a 3GPP Rel-13, 3GPP Release 12 (Rel-12), and/or any other scheme according to any other protocol and/or Specification.

In some demonstrative embodiments, UE 102 may be configured to use the regulatory information received from cellular manager 104, for example, at least to improve and/or optimize WLAN scanning in one or more frequency channels and/or frequency band, e.g., one or more channels in the 5 GHz frequency band, e.g., as described below.

In some demonstrative embodiments, UE 102 may be configured to determine whether or not one or more regulatory requirements are met with respect to the one or more frequency channels and/or frequency bands, for example, based on the regulatory information received from cellular manager 104, e.g., as described below.

In some demonstrative embodiments, UE 102 may be configured to select to use active scanning over a frequency band, e.g., one or more channels of the 5 GHz frequency band, for example, if the UE 102 determines that the regulatory requirements are met.

In some demonstrative embodiments, cellular manager 104 may obtain, and/or may be provided with, regulatory information ("WLAN regulatory information") indicating one or more regulatory restrictions corresponding to WLAN communications over at least one WLAN frequency band, for example, one or more channels of at least one frequency band, for example, a 5 GHz band, e.g., as described below.

In some demonstrative embodiments, an eNB, e.g., cellular manager 104, may be configured to be aware of one or more WLAN APs 119, which may be deployed by an operator of a cellular network, for example, in a vicinity of the eNB.

In some demonstrative embodiments, the eNB, e.g., cellular manager 104, may be configured to be aware of whether one or more of WLAN APs 119 operate over one or more regulated frequency bands, e.g., a 5 GHz band.

In some demonstrative embodiments, the eNB, e.g., cellular manager 104, may be configured to be aware of one or more regulatory restrictions over the one or more regulated frequency bands.

In some demonstrative embodiments, the eNB, e.g., cellular manager 104, may be configured to be aware of whether one or more of WLAN APs 119, which operate over the one or more regulated frequency bands, allow active scanning over the one or more regulated frequency bands.

In some demonstrative embodiments, the eNB, e.g., cellular manager 104, may be configured to be aware of one or more additional or alternative regulatory constraints corresponding to the one or more regulated frequency bands, for example, a Tx power restriction, a Radio-Frequency (RF) energy emission limitation in a spectral range, and/or any other additional or alternative restriction.

In some demonstrative embodiments, at least part of the WLAN regulatory information may be preconfigured at cellular manager 104, for example, by an Operations, Administration and Management (OAM) entity (not shown in FIG. 1) of CN 183.

In some demonstrative embodiments, at least part of the WLAN regulatory information may be obtained by cellular manager 104 from WT node 106, e.g., via interface 199.

In some demonstrative embodiments, cellular manager 104 and/or WT node 106 may be configured to utilize interface 199 to provide a flow control interface between the cellular manager 104 and collocated or non-collocated WLAN APs and/or multiple WLAN APs controlled by a Network Controller or Router, for example, WLAN APs 119, e.g., as described below.

In some demonstrative embodiments, cellular manager 104 may receive at least part of the WLAN regulatory information from one or more of WLAN APs 119.

In some demonstrative embodiments, cellular manager 104 may be configured to receive at least part of the WLAN regulatory information from WT node 106, for example, if cellular manager 104 does not communicate directly with WLAN APs 119, e.g., in a deployment according to a non-collocated architecture.

In some demonstrative embodiments, controller 149 may be configured to send the WLAN regulatory information to cellular manager 104. For example, message processor 150 may be configured to generate one or more messages including the WLAN regulatory information corresponding to WLAN APs 119, and interface 192 may send the message to cellular manager 104, e.g., via interface 199.

In some demonstrative embodiments, cellular manager 104 may be implemented according to the collocated eNB/WLAN architecture. For example, cellular manager 104 may include a collocated eNB Access Point (eNB/AP), which may include at least one WLAN AP 119. According to these embodiments, the WLAN regulatory information may correspond to the WLAN AP collocated with cellular manager 104.

In some demonstrative embodiments, message processor 144 may be configured to generate a cellular message including the WLAN regulatory information indicating one or more regulatory restrictions corresponding to WLAN communications over at least one WLAN frequency band, e.g., as described below.

In some demonstrative embodiments, the at least one WLAN frequency band may include a 5 GHz frequency band and/or any other frequency band, e.g., as described below.

In some demonstrative embodiments, the WLAN regulatory information may include at least an indication on whether or not WLAN active scanning is allowed over the WLAN frequency band, e.g., as described below.

In some demonstrative embodiments, at least part of the WLAN regulatory information may be preconfigured at cellular manager 104, e.g., as described above.

In some demonstrative embodiments, controller 182 may be configured to determine at least part of the WLAN regulatory information based on at least one message from WT node 106, e.g., as described below.

In some demonstrative embodiments, WT node 106 may be configured to send at least part of the WLAN regulatory information to cellular manager 104 over interface 199, for example, using Xw-AP signaling, e.g., as described below.

In some demonstrative embodiments, the Xw-AP signaling may be configured to enable cellular manager 104 to collect information from the WLAN, e.g., at least information indicating, which WLAN channels/frequencies WLAN APs 119 are operating on.

In some demonstrative embodiments, the Xw-AP signaling may be enhanced, for example, to enable WT node 106 to provide to cellular manager 104 WLAN regulatory information corresponding to a domain including WLAN APs 119.

In some demonstrative embodiments, the WLAN regulatory information may include information indicating whether or not UE 102 may be allowed to use active scanning on an AP channel utilized by WLAN AP 119, for example, as long as UE 102 is connected to cellular manager 104, e.g., over a licensed spectrum of a primary cell.

In some demonstrative embodiments, the WLAN regulatory information may include any other additional or alternative regulatory information corresponding to the domain including WLAN APs 119, for example, a maximal Tx power limit, RF energy emission in a specific spectral range, and the like.

In some demonstrative embodiments, enabling UE 102 to perform active scanning, for example, as long as UE 102 is connected to cellular manager 104, may enable, for example, to ensure that the regulatory constraints at a domain of cellular manager 104 are being enforced. For example, the connection between UE 102 and cellular manager 104 may ensure that the UE 102 is located in the domain of cellular manager 104. This may enable to ensure that UE 102 is allowed to operate according to the regulatory restrictions corresponding to the domain of cellular manager 104, for example, as long as UE 102 is in the domain of cellular manager 104.

In some demonstrative embodiments, message processor 150 may be configured to generate an XwAP message including the WLAN regulatory information, cellular manager interface 192 may be configured to send the XwAP message over interface 199, WT node interface 169 may be configured to receive the XwAP message, and/or message processor 144 may be configured to process the XwAP message received via interface 199.

In some demonstrative embodiments, the XwAP message may include, for example, an XwAP Setup message, an XwAP WLAN Update message, or any other type of XwAP message.

In some demonstrative embodiments, the XwAP message may include, for example, one or more WLAN identifiers corresponding to one or more WLAN APs 119, for example, a Service Set Identifier (SSID), a Basic Service Set Identifier (BSSID), and/or a Homogenous Extended Service Set Identifier (HESSID).

In some demonstrative embodiments, the XwAP message may include, for example, a channel/frequency indication associated a WLAN identifier corresponding to a WLAN AP 119. For example, the channel/frequency indication associated with a WLAN identifier of a WLAN AP 119 may indicate one or more channels and/or frequency bands utilized by the WLAN AP 119.

In some demonstrative embodiments, the XwAP message may include, for example, an indication ("active scanning allowed indication") associated a WLAN identifier corresponding to a WLAN AP 119. For example, the active scanning allowed indication associated with a WLAN identifier of a WLAN AP 119 may be configured to indicate whether or not active scanning is allowed over the one or more channels and/or frequency bands indicated by the channel/frequency indication associated with a WLAN identifier of a WLAN AP 119.

In some demonstrative embodiments, the XwAP message may include, for example, one or more elements and/or fields of the following information Element (IE) ("WLAN Regulatory Information IE"):

TABLE 1

| IE/Group Name | Presence | Range | IE type and reference | Semantics description |
|---|---|---|---|---|
| Active Scan Supported | M | | ENUMERATED (supported, not-supported, channel-defined) | |
| Scan Config | | | | |
| >>WLAN Band Indicator | | | ENUMERATED (band2dot4, band5) | |
| >>Channels | | 1 ... <maxnoofBands> | | |
| >>Channel | | | INTEGER | |
| >>Tx Power Limitation | | | INTEGER | |
| >>RF Energy Emission | | | INTEGER | |

In some demonstrative embodiments, WLAN Regulatory Information IE may be included as part of a WLAN information IE, which may be included, for example, in an XwAP message, for example, a WT configuration update message, e.g., as follows:

Direction: WT→eNB.

TABLE 2

| IE/Group Name | Presence | Range | IE type and reference | Semantics description | Criticality | Assigned Criticality |
|---|---|---|---|---|---|---|
| Message Type | M | | 9.2.1 | | YES | reject |
| WLAN Identifiers To Add List | | 0 . . . 1 | | List of identifiers added by the WT | GLOBAL | reject |
| >WLAN Identifiers To Add Item | | 0 . . . <maxnoofBSSsperWT> | | | | |
| >>WLAN Information | M | | 9.2.7 | | | |
| WLAN Identifiers To Modify List | | 0 . . . 1> | | List of identifiers modified by the WT | GLOBAL | reject |
| >WLAN Identifiers To Modify Item | | 0 . . . <maxnoofBSSsperWT> | | | | |
| >>WLAN Information | M | | 9.2.7 | | | |
| WLAN Identifiers To Delete List | | 0 . . . 1 | | List of identifiers deleted by the WT | GLOBAL | reject |
| >WLAN Identifiers To Delete Item | | 0 . . . <maxnoofBSSsperWT> | | | | |
| >>Old BSSID | M | | BSSID 9.2.8 | | | |

| Range bound | Explanation |
|---|---|
| maxnoofBSSsperWT | 4096 |

In some demonstrative embodiments, the WLAN information IE may include the WLAN Regulatory Information IE, e.g., as follows:

TABLE 3

| IE/Group Name | Presence | Range | IE type and reference | Semantics description |
|---|---|---|---|---|
| BSSID List | | 0 . . . 1 | | |
| >BSSID List Item | | 1 . . . <maxnoofBSSIDs> | | |
| >>BSSID | M | | 9.2.8 | |
| >>WLAN Band Information List | | 0 . . . 1 | | |
| >>>WLAN Band Information Item | | 1 . . . <maxnoofBands> | | |
| >>>>WLAN Band Information | | | 9.2.13 | |
| >>Regulatory Information | O | | | |
| SSID | O | | 9.2.9 | |
| HESSID | O | | 9.2.10 | |

In some demonstrative embodiments, the XwAP message carrying the WLAN regulatory information may have any other format and/or may include and other additional or alternative information.

In some demonstrative embodiments, the cellular interface of cellular manager 104, e.g., cellular TRx 167, may be configured send the cellular message including the WLAN regulatory information to UE 102 via a cellular link, e.g., as described below.

In some demonstrative embodiments, the WLAN regulatory information sent from cellular manager 104 to UE 102 may include an indication of one or more WLAN channels within the WLAN frequency band to which the regulatory restrictions are to be applied.

In some demonstrative embodiments, the WLAN regulatory information may include information corresponding to two or more different channels within the WLAN frequency band.

In some demonstrative embodiments, the WLAN regulatory information may include at least first channel information to identify one or more first WLAN channels within the WLAN frequency band, and first regulatory information indicating first regulatory restrictions to be applied to the one or more first WLAN channels.

In some demonstrative embodiments, the WLAN regulatory information may include at least second channel information to identify one or more second WLAN channels within the WLAN frequency band, e.g., different from the one or more first WLAN channels, and second regulatory information indicating second regulatory restrictions to be applied to the one or more second WLAN channels, e.g., different from the first regulatory restrictions.

In some demonstrative embodiments, the WLAN regulatory information sent from cellular manager 104 to UE 102 may be configured to inform UE 102 which one or more WLAN channels, if any, may be allowed for performing active scanning.

In some demonstrative embodiments, the WLAN regulatory information sent from cellular manager 104 to UE 102 may be configured to provide to UE 102 any additional or alternative regulatory information.

In some demonstrative embodiments, the WLAN regulatory information may include at least an indication of a Transmit (Tx) power limitation over the WLAN frequency band.

In some demonstrative embodiments, the WLAN regulatory information may include at least an indication of a Radio-Frequency (RF) energy emission limitation in a spectral range.

In some demonstrative embodiments, cellular manager 104 may be configured to provide the WLAN regulatory information to UE 102, for example, via broadcast signaling and/or or dedicated Radio Resource Control (RRC) signaling, e.g., as described below.

In some demonstrative embodiments, message processor 144 may be configured to generate an RRC message including the WLAN regulatory information. For example, message processor 144 may be configured to generate an RRC message addressed to UE 102. For example, controller 182 may be configured to trigger, cause, instruct and/or request cellular TRx 167 to transmit the RRC message to UE 102.

In some demonstrative embodiments, message processor 144 may be configured to generate a broadcast message including the regulatory information. For example, message processor 144 may be configured to generate a broadcast message, e.g., addressed to a broadcast address, including the regulatory information. For example, controller 182 may be configured to trigger, cause, instruct and/or request cellular TRx 167 to transmit the broadcast message.

In some demonstrative embodiments, a RRC protocol between a RAN and UE 102 over a primary cell, e.g., LTE, may be extended, for example, to provide UE 102 with information corresponding to WLAN STAs 119, for example, a list of WLAN AP IDs, which may be used by the UE 102 for WiFi Link Aggregation (WLA), for example, while being in the coverage area of the cellular cell.

In some demonstrative embodiments, cellular manager 104 may use RRC signaling to inform UE 102 of the regulatory information corresponding to the WLAN APs 119, e.g., as described below.

In some demonstrative embodiments, the regulatory information may include, for example, a plurality of information elements corresponding to a respective plurality of WLAN APs 119, e.g., in the form of a list. For example, an information element corresponding to a WLAN AP 119 may include, for example, at least an identifier of the WLAN AP, e.g., a BSSID, an SSID, an HESSID, and the like; channel/band information indicating at least one WLAN frequency band and/or a frequency channel within the WLAN frequency band; an indication on whether or not WLAN active scanning is allowed over the WLAN frequency band and/or frequency channel; and/or an indication of one or more other regulatory restrictions, e.g., as described below.

In some demonstrative embodiments, the indication of one or more other regulatory restrictions may include, for example, an indication of a Tx power limitation, an indication of an RF emission limitation, and/or an indication of any other restriction and/or limitation.

In some demonstrative embodiments, the regulatory information may be provided in the form of an indication per channel and/or per WLAN, for example, using a plurality of information elements corresponding to a plurality of frequency channels and/or WLANs supported by WLAN APs 119.

In some demonstrative embodiments, the regulatory information may be provided in the form of a group indication, for example, collectively corresponding to a group of channels and/or WLANs, or even a global indication, for example, collectively corresponding to all channels and/or WLANs.

In some demonstrative embodiments, the regulatory information may be provided in the form of an information element, e.g., corresponding to one or more channels and/or WLANs.

In some demonstrative embodiments, the information element may include for example, an indicator ("passive scanning only") to indicate whether or not only passive scanning is allowed.

In some demonstrative embodiments, the information element may include for example, an indicator ("active scanning allowed") to indicate whether or not active scanning is allowed.

In some demonstrative embodiments, the information element may include for example, an indicator ("Tx power") to indicate a Tx power limitation.

In some demonstrative embodiments, the information element may include for example, an indicator ("RF emission") to indicate an RF energy emission in a specific spectral range limitation.

In some demonstrative embodiments, an RRC message including the regulatory information may include, for example, a System Information Block (SIB) Type 17 message, and/or any other type of message.

In some demonstrative embodiments, the System Information Block Type 17 may include information about WLAN identifiers that UE 102 may use for WLAN offload.

In some demonstrative embodiments, the System Information Block Type 17 may be enhanced, for example, to include the regulatory information, for example, in the form of WLAN channel/frequency information along with at least an indication whether or not active scanning is allowed on the channel/frequency, and/or other regulatory restrictions.

In some demonstrative embodiments, the regulatory information may be included for example, as part of an information element, e.g., as follows:

```
WLAN-Scan-Parameters-rXX ::=           SEQUENCE {
    wlan-active-scan-rXX                   ENUMERATED {supported, not-supported,
channel-defined} OPTIONAL,
    wlan-channel-scan-r13                  SEQUENCE (SIZE (1..maxWLAN-Channel-Scan-
Config-rXX)) OF WLAN-Channel-Scan-Config-rXX OPTIONAL, -Cond
ScanChannelDefined
    ...
}
WLAN-Channel-Scan-Config-rXX ::=           SEQUENCE {
    wlanBand                           WLAN-BandIndicator-r13,
    channelNumbers-r13                 WLAN-ChannelInfo-r13,
    wlan-active-scan-channel-rXX           ENUMERATED {supported} OPTIONAL,
    tx-power-limitation                INTEGER (0..255) OPTIONAL,
    rf-energy-emission                 INTEGER (0..255) OPTIONAL,
    ...
}
WLAN-BandIndicator-r13 ::= ENUMERATED {band2dot4, band5,...}
WLAN-ChannelInfo-r13 ::= SEQUENCE (SIZE (1..maxWLAN-Channels-r13)) OF
WLAN-Channel-r13
WLAN-Channel-r13 ::= INTEGER(0..255)
tx-power-limitation: max TX power of the probe request in dB
```

In some demonstrative embodiments, an RRC message including the regulatory information may include, for example, a dedicated RRC message, for example, a RRC-ConnectionReconfiguration message, or any other existing RRC message.

In some demonstrative embodiments, the regulatory information may be included as part of any other SIB, e.g., as an IE in an existing SIB, a new dedicated SIB, or as part of a new dedicated RRC message.

In other embodiments, the regulatory information may be included as part of any other message type, message format, information element, and/or format.

In some demonstrative embodiments, UE 102 may receive the regulatory information from cellular manager 104. For example, cellular transceiver 165 may be configured to process reception of the cellular message, e.g., the RRC message or the broadcast message, including the regulatory information corresponding to WLAN APs 119. For example, the regulatory information may indicate one or more regulatory restrictions corresponding to WLAN communications over at least one WLAN frequency band. For example, the regulatory information may include at least an indication on whether or not WLAN active scanning is allowed over the WLAN frequency band, e.g., as described above.

In some demonstrative embodiments, controller 197 may be configured to access and/or process the regulatory information.

In some demonstrative embodiments, controller 197 may be configured to trigger UE 102 to perform one or more operations and/or communications, for example, based on the regulatory information, e.g., as described below.

In some demonstrative embodiments, controller 197 may be configured to, based on the regulatory information, enable or disable WLAN TRx 163 to perform a WLAN active scan over the WLAN frequency band, e.g., over the entire WLAN frequency band or over one or more channels of the WLAN frequency band.

In some demonstrative embodiments, controller 197 may be configured to enable UE 102 to perform active scanning, for example, if allowed according to the regulatory information; or to perform passive scanning, for example, if active scanning is not allowed by the regulatory information.

In some demonstrative embodiments, controller 197 may be configured to disable the WLAN TRx 163 to perform a WLAN active scan over the WLAN frequency band, for example, when the regulatory information indicates that only WLAN passive scanning is allowed.

In some demonstrative embodiments, controller 197 may be configured to enable the WLAN TRx 163 to perform a WLAN active scan over the WLAN frequency band, for example, when the regulatory information indicates that WLAN active scanning is allowed.

In some demonstrative embodiments, controller 197 may be configured to enable the WLAN transceiver 163 perform a WLAN active scan over the WLAN frequency band, for example, when the regulatory information indicates that WLAN active scanning is allowed, and only when UE 102 is connected to cellular node 104.

In some demonstrative embodiments, the regulatory information may include one or more indications of one or more additional or alternative restrictions, e.g., as described above.

In some demonstrative embodiments, the regulatory information may include an indication of a Tx power limitation, e.g., as described above. According to these embodiments, controller 197 may be configured, for example, to control a Tx power of the WLAN transceiver 163 over the WLAN frequency band, e.g., based on the Tx power limitation.

In some demonstrative embodiments, the regulatory information may include an indication of a RF energy emission limitation in a spectral range. According to these embodiments, controller 197 may be configured, for example, to control the WLAN transceiver 163 based on the RF energy emission limitation.

Figure 2:
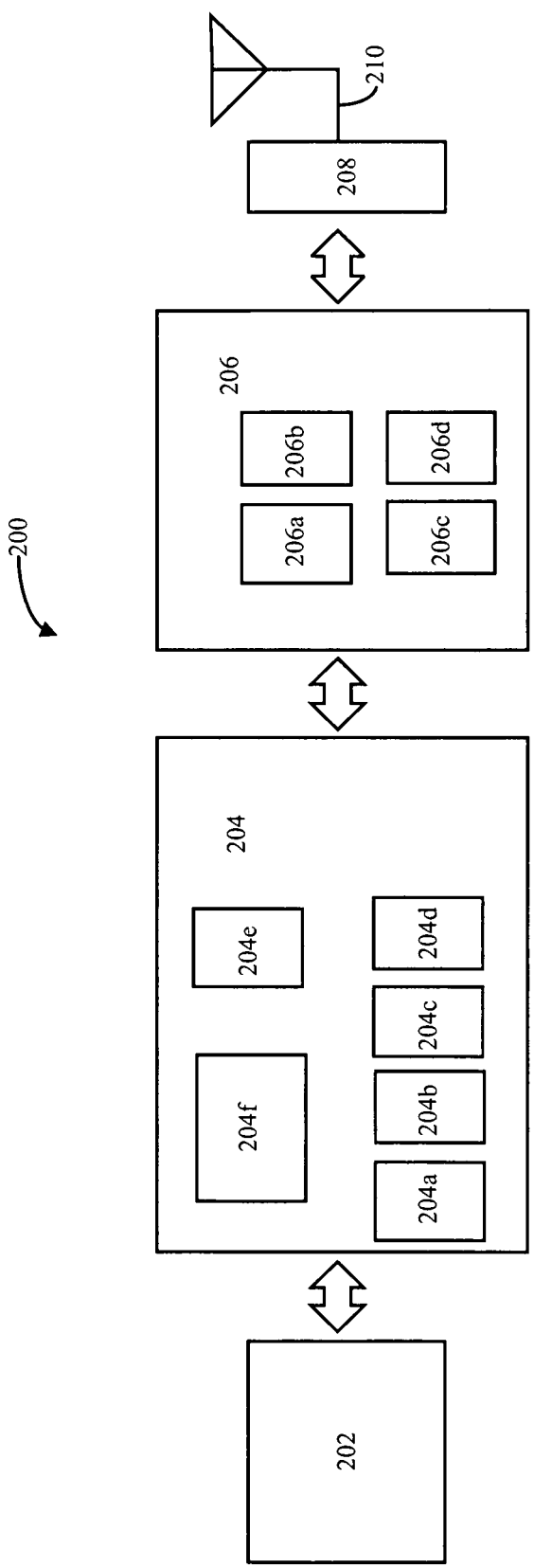
FIG. 2 is a schematic illustration of elements of a User Equipment (UE), in accordance with some demonstrative embodiments.

Reference is made to FIG. 2, which schematically illustrates elements of a UE device 200, in accordance with some demonstrative embodiments. For example, one or more elements of UE device 200 may perform the functionality of one or more elements of UE 102 (FIG. 1). In one example, one or more elements of UE device 200 may be configured to perform the functionality of one or more of cellular TRx 165 (FIG. 1), WLAN TRx 163 (FIG. 1), controller 197 (FIG. 1), message processor 198 (FIG. 1), and/or one or more other elements of UE 102 (FIG. 1). In some demonstrative embodiments, embodiments of a UE may be implemented into a system using any suitably configured hardware and/or software. FIG. 2 illustrates, for one embodiment, example components of UE device 200.

In some demonstrative embodiments, UE device 200 may include application circuitry 202, baseband circuitry 204, Radio Frequency (RF) circuitry 206, front-end module (FEM) circuitry 208, and one or more antennas 210, coupled together at least as shown.

In one example, application circuitry 202 may be configured to perform at least part of the functionality of controller 197 (FIG. 1), and/or message processor 198 (FIG. 1); and/or baseband circuitry 204, RF circuitry 206, and/or FEM circuitry 208 may be configured to perform at least part of the functionality of cellular TRx 165 (FIG. 1), WLAN TRx 163 (FIG. 1), controller 197 (FIG. 1), and/or message processor 198 (FIG. 1).

In some demonstrative embodiments, the application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

In some demonstrative embodiments, the baseband circuitry 204 may include circuitry such as, but not limited to, one or more single-core or multi-core processors. The baseband circuitry 204 may include one or more baseband processors and/or control logic to process baseband signals received from a receive signal path of the RF circuitry 206 and to generate baseband signals for a transmit signal path of the RF circuitry 206. Baseband processing circuitry 204 may interface with the application circuitry 202, for example, for generation and processing of the baseband signals and for controlling operations of the RF circuitry 206. For example, in some embodiments, the baseband circuitry 204 may include a second generation (2G) baseband processor 204*a* a third generation (3G) baseband processor 204*b*, a fourth generation (4G) baseband processor 204*c*, and/or other baseband processor(s) 204*d* for other existing generations, generations in development or to be developed in the future (e.g., fifth generation (5G), 6G, etc.). The baseband circuitry 204 (e.g., one or more of baseband processors 204*a-d*) may handle various radio control functions that enable communication with one or more radio networks via the RF circuitry 206. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, and/or constellation mapping/demapping functionality. In some embodiments, encoding/decoding circuitry of the baseband circuitry 204 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some demonstrative embodiments, the baseband circuitry 204 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 204*e* of the baseband circuitry 204 may be configured, for example, to run elements of the protocol stack for signaling of the PHY, MAC, RLC, PDCP and/or RRC layers. In some embodiments, the baseband circuitry may include one or more audio digital signal processor(s) (DSP) 204*f*. The audio DSP(s) 204*f* may be include elements for compression/decompression and echo cancellation, and/or may include other suitable processing elements in other embodiments. Components of the baseband circuitry 204 may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some demonstrative embodiments, the baseband circuitry 204 may provide for communication compatible with one or more radio technologies. For example, in some embodiments, the baseband circuitry 204 may support communication with an evolved universal terrestrial radio access network (EUTRAN) and/or other wireless metropolitan area networks (WMAN), a wireless local area network (WLAN), a wireless personal area network (WPAN), and/or one or more additional or alternative networks. Embodiments in which the baseband circuitry 204 is configured to support radio communications of more than one wireless protocol may be referred to as multi-mode baseband circuitry.

In some demonstrative embodiments, RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208, and to provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some demonstrative embodiments, the RF circuitry 206 may include a receive signal path and a transmit signal path. The receive signal path of the RF circuitry 206 may include mixer circuitry 206*a*, amplifier circuitry 206*b*, and filter circuitry 206*c*. The transmit signal path of the RF circuitry 206 may include filter circuitry 206*c* and mixer circuitry 206*a*. RF circuitry 206 may also include synthesizer circuitry 206*d* for synthesizing a frequency for use by the mixer circuitry 206*a* of the receive signal path and the transmit signal path. In some embodiments, the mixer circuitry 206*a* of the receive signal path may be configured to down-convert RF signals received from the FEM circuitry 208 based on the synthesized frequency provided by synthesizer circuitry 206*d*. The amplifier circuitry 206*b* may be configured to amplify the down-converted signals and the filter circuitry 206*c* may be, for example, a low-pass filter (LPF) or a band-pass filter (BPF), configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect.

In some demonstrative embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c. The filter circuitry 206c may include a low-pass filter (LPF), although the scope of the embodiments is not limited in this respect.

In some demonstrative embodiments, the mixer circuitry 206a of the receive signal path and the mixer circuitry 206a of the transmit signal path may include two or more mixers and may be arranged for quadrature downconversion and/or upconversion respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer, circuitry 206a may be arranged for direct downconversion and/or direct upconversion, respectively. In some embodiments, the mixer circuitry 206a of the receive signal path and the mixer circuitry 206a of the transmit signal path may be configured for super-heterodyne operation.

In some demonstrative embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry, and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some demonstrative embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider.

In some demonstrative embodiments the synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer.

In some demonstrative embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

In some demonstrative embodiments, synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some demonstrative embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 206 may include an IQ/polar converter.

In some demonstrative embodiments, FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210.

In some demonstrative embodiments, the FEM circuitry 208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210.

In some embodiments, the UE device 200 may include one or more additional or alternative elements such as, for example, memory/storage, display, camera, sensor, and/or input/output (I/O) interface.

Figure 3:
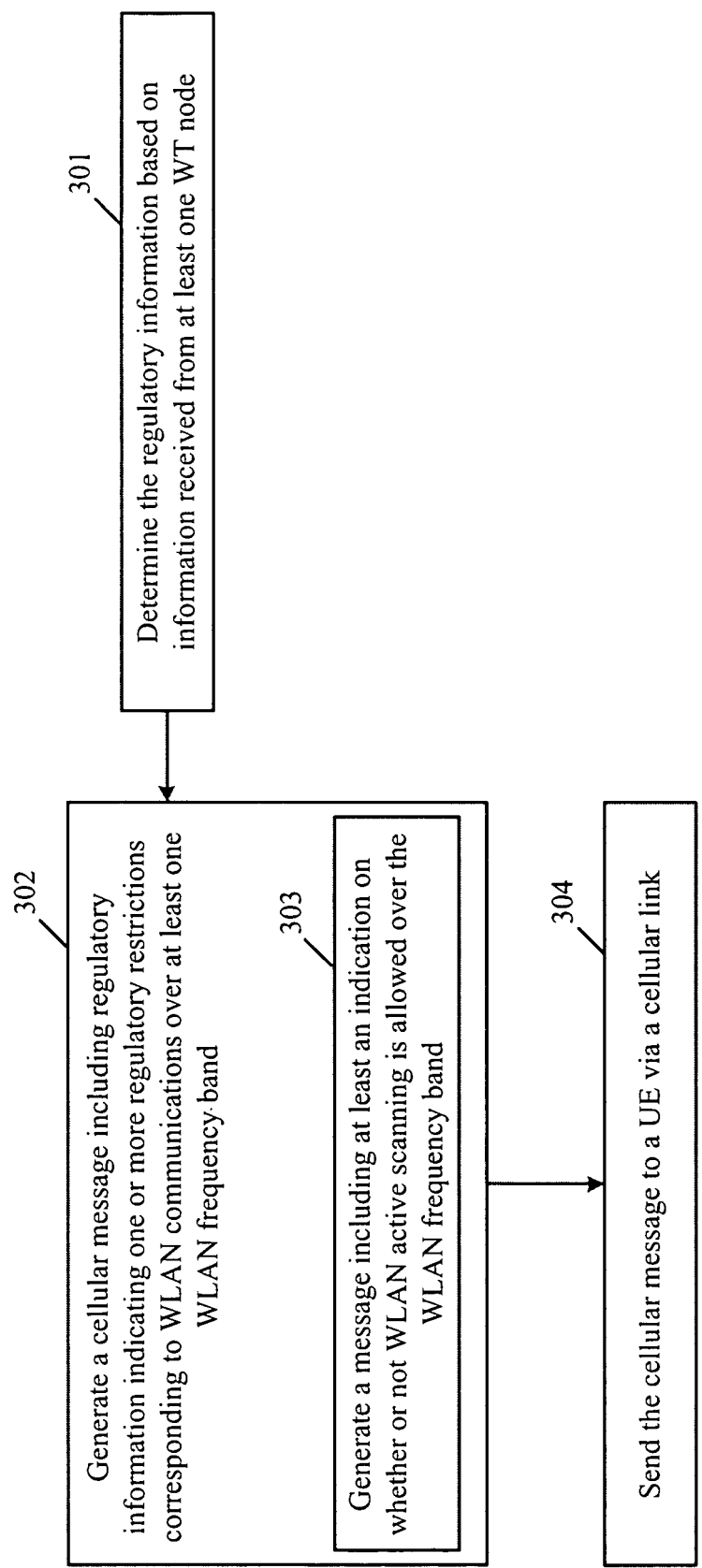
FIG. 3 is a schematic flow-chart illustration of a method of providing cellular-assisted Wireless Local Area Network (WLAN) regulatory information, in accordance with some demonstrative embodiments.

FIG. 3 is a schematic flow-chart illustration of a method of providing cellular-assisted WLAN regulatory information, in accordance with some demonstrative embodiments. In some embodiments, one or more of the operations of the method of FIG. 3 may be performed by a wireless communication system, e.g., system 100 (FIG. 1); a cellular manager, e.g., cellular manager 104 (FIG. 1); an interface, e.g., cellular TRx 167 (FIG. 1), and/or interface 169 (FIG. 1); a message processor, e.g., message processor 144 (FIG. 1); and/or a controller, e.g., controller 182 (FIG. 1).

As indicated at block 302, the method may include generating a cellular message including regulatory information indicating one or more regulatory restrictions corresponding to WLAN communications over at least one WLAN frequency band. For example, message generator 144 (FIG. 1) may be configured to generate a message, e.g., an RRC message or a broadcast message, including the regulatory information corresponding to one or more WLAN frequency bands and/or one or more WLAN channels within the one or more WLAN frequency bands, which may be utilized by WLAN APs 119 (FIG. 1), e.g., as described above.

As indicated at block 303, generating the message including the regulatory information may include generating the message including at least an indication on whether or not WLAN active scanning is allowed over the WLAN frequency band. For example, message generator 144 (FIG. 1) may be configured to generate a message, e.g., an RRC message or a broadcast message, including the indication on whether or not WLAN active scanning is allowed over the WLAN frequency band, e.g., as described above.

As indicated at block 301, the method may include determining the regulatory information based on information received from at least one WT node. For example, controller 182 (FIG. 1) may be configured to determine the regulatory information based on information from WT node 106 (FIG. 1) corresponding to one or more WLAN APs 119 (FIG. 1), e.g., as described above.

As indicated at block 304, the method may include sending the cellular message to a UE via a cellular link. For example, controller 182 (FIG. 1) may trigger cellular TRx 167 (FIG. 1) to transmit the message including the regulatory information to UE 102 (FIG. 1), e.g., as described above.

Figure 4:
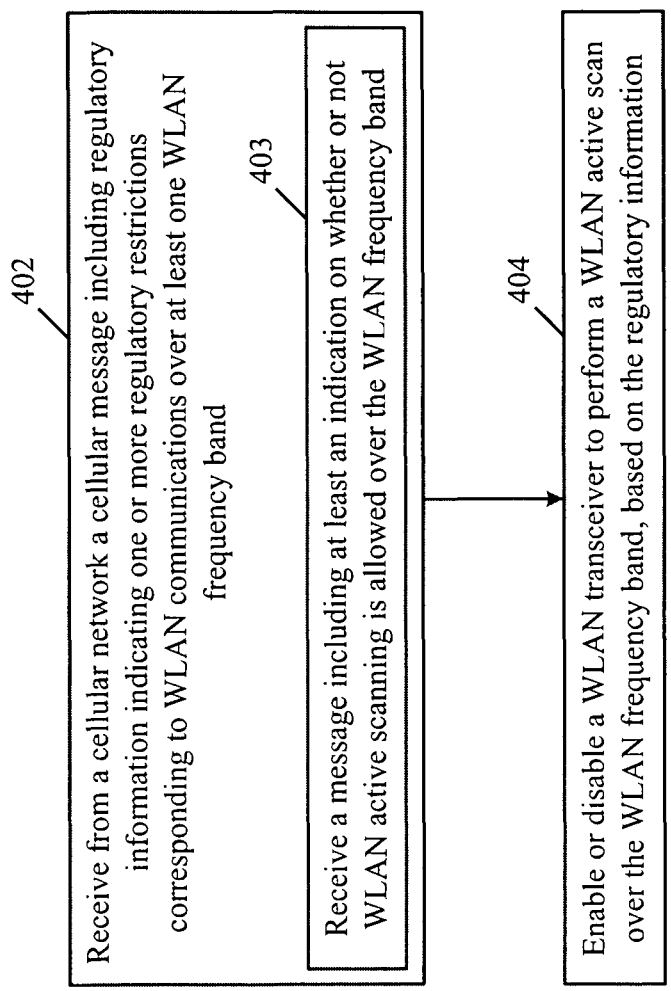
FIG. 4 is a schematic flow-chart illustration of a method of performing a WLAN scan based on cellular-assisted WLAN regulatory information, in accordance with some demonstrative embodiments.

FIG. 4 is a schematic flow-chart illustration of a method of performing a WLAN scan based on cellular-assisted WLAN regulatory information, in accordance with some demonstrative embodiments. In some embodiments, one or more of the operations of the method of FIG. 4 may be performed by a wireless communication system, e.g., system 100 (FIG. 1); a UE, e.g., UE 102 (FIG. 1); an interface, e.g., cellular TRx 165 (FIG. 1), and/or WLAN TRx 163 (FIG. 1); a message processor, e.g., message processor 198 (FIG. 1); and/or a controller, e.g., controller 197 (FIG. 1).

As indicated at block 402, the method may include receiving from a cellular network a cellular message including regulatory information indicating one or more regulatory restrictions corresponding to WLAN communications over at least one WLAN frequency band. For example, cellular TRx 165 (FIG. 1) may receive from cellular manager 104 (FIG. 1) a message, e.g., an RRC message or a broadcast message, including the regulatory information corresponding to one or more WLAN frequency bands and/or one or more WLAN channels within the one or more WLAN frequency bands, which may be utilized by WLAN APs 119 (FIG. 1), e.g., as described above.

As indicated at block 403, receiving the message including the regulatory information may include receiving a message including at least an indication on whether or not WLAN active scanning is allowed over the WLAN frequency band. For example, message generator 144 (FIG. 1) may be configured to receive a message, e.g., an RRC message or a broadcast message, including the indication on whether or not WLAN active scanning is allowed over the WLAN frequency band, e.g., as described above.

As indicated at block 404, the method may include enabling or disabling a WLAN transceiver to perform a WLAN active scan over the WLAN frequency band, for example, based on the regulatory information. For example, controller 197 (FIG. 1) may be configured to, based on the regulatory information, enable or disable WLAN transceiver 163 (FIG. 1) to perform a WLAN active scan over the WLAN frequency band, e.g., as described above.

Figure 5:
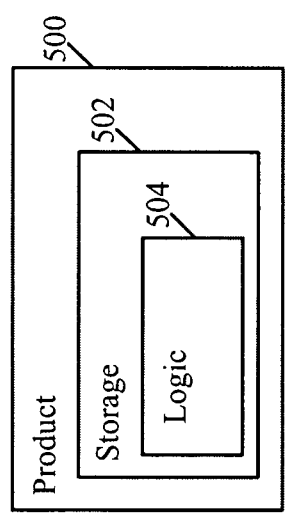
FIG. 5 is a schematic illustration of a product, in accordance with some demonstrative embodiments.

Reference is made to FIG. 5, which schematically illustrates a product of manufacture 500, in accordance with some demonstrative embodiments. Product 500 may include a non-transitory machine-readable storage medium 502 to store logic 504, which may be used, for example, to perform at least part of the functionality of one or more components of a cellular manager, for example, an eNB, e.g., cellular manager 104 (FIG. 1); one or more components of a UE, e.g., UE 102 (FIG. 1) and/or UE 200 (FIG. 2); one or more components of a WT node, e.g., WT node 106 (FIG. 1); a controller, e.g., controller 182 (FIG. 1), controller 197 (FIG. 1), and/or controller 149 (FIG. 1); and/or a message processor, e.g., message processor 144 (FIG. 1), message processor 198 (FIG. 1), and/or message processor 150 (FIG. 1), and/or to perform one or more operations of the methods of FIGS. 3 and/or 4, and/or one or more operations and/or functionalities described herein. The phrase "non-transitory machine-readable medium" is directed to include all computer-readable media, with the sole exception being a transitory propagating signal.

In some demonstrative embodiments, product 500 and/or machine-readable storage medium 502 may include one or more types of computer-readable storage media capable of storing data, including volatile memory, non-volatile memory, removable or non-removable memory, erasable or non-erasable memory, writeable or re-writeable memory, and the like. For example, machine-readable storage medium 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONGS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus of a User Equipment (UE), the apparatus comprising a Wireless Local Area Network (WLAN) transceiver; a cellular transceiver to receive from an Evolved Node B (eNB) a cellular message comprising regulatory information indicating one or more regulatory restrictions corresponding to WLAN communications over at least one WLAN frequency band, the regulatory information comprising at least an indication on whether or not WLAN active scanning is allowed over the WLAN frequency band; and a controller; component configured to, based on the regulatory information, enable or disable the WLAN transceiver to perform a WLAN active scan over the WLAN frequency band.

Example 2 includes the subject matter of Example 1, and optionally, wherein the controller component is configured to disable the WLAN transceiver to perform a WLAN active scan over the WLAN frequency band, when the regulatory information indicates that only WLAN passive scanning is allowed.

Example 3 includes the subject matter of Example 1 or 2, and optionally, wherein the controller component is configured to enable the WLAN transceiver to perform a WLAN active scan over the WLAN frequency band, when the regulatory information indicates that WLAN active scanning is allowed.

Example 4 includes the subject matter of any one of Examples 1-3, and optionally, wherein the controller component is configured to enable the WLAN transceiver to perform a WLAN active scan over the WLAN frequency band, when the regulatory information indicates that WLAN active scanning is allowed, and only when the UE is connected to the eNB.

Example 5 includes the subject matter of any one of Examples 1-4, and optionally, wherein the regulatory information comprises an indication of one or more WLAN channels within the WLAN frequency band to which the regulatory restrictions are to be applied.

Example 6 includes the subject matter of any one of Examples 1-5, and optionally, wherein the regulatory information comprises at least first channel information to identify one or more first WLAN channels within the WLAN frequency band, first regulatory information indicating first regulatory restrictions to be applied to the one or more first WLAN channels, second channel information, to identify one or more second WLAN channels within the WLAN frequency band, and second regulatory information indicating second regulatory restrictions to be applied to the one or more second WLAN channels.

Example 7 includes the subject matter of any one of Examples 1-6, and optionally, wherein the regulatory information comprises an indication of a Transmit (Tx) power limitation, the controller component configured to control a Tx power of the WLAN transceiver over the WLAN frequency band based on the Tx power limitation.

Example 8 includes the subject matter of any one of Examples 1-7, and optionally, wherein the regulatory information comprises an indication of a Radio-Frequency (RF) energy emission limitation in a spectral range, the controller component configured to control the WLAN transceiver based on the RF energy emission limitation.

Example 9 includes the subject matter of any one of Examples 1-8, and optionally, wherein the cellular message comprises a Radio Resource Control (RRC) message addressed to the UE.

Example 10 includes the subject matter of any one of Examples 1-8, and optionally, wherein the cellular message comprises a broadcast message.

Example 11 includes the subject matter of any one of Examples 1-10, and optionally, wherein the at least one WLAN frequency band comprises at least a 5 Gigahertz (GHz) frequency band.

Example 12 includes the subject matter of any one of Examples 1-11, and optionally, comprising one or more antennas, a memory and a processor.

Example 13 includes an apparatus comprising circuitry and logic configured to trigger a User Equipment to process a cellular message from an Evolved Node B (eNB), the cellular message comprising regulatory information indicating one or more regulatory restrictions corresponding to WLAN communications over at least one WLAN frequency band, the regulatory information comprising at least an indication on whether or not WLAN active scanning is allowed over the WLAN frequency band; and based on the regulatory information, enable or disable the UE to perform a WLAN active scan over the WLAN frequency band.

Example 14 includes the subject matter of Example 13, and optionally, wherein the apparatus is configured to disable the UE to perform a WLAN active scan over the WLAN frequency band, when the regulatory information indicates that only WLAN passive scanning is allowed.

Example 15 includes the subject matter of Example 13 or 14, and optionally, wherein the apparatus is configured to enable the UE to perform a WLAN active scan over the WLAN frequency band, when the regulatory information indicates that WLAN active scanning is allowed.

Example 16 includes the subject matter of any one of Examples 13-15, and optionally, wherein the apparatus is configured to enable the UE to perform a WLAN active scan over the WLAN frequency band, when the regulatory information indicates that WLAN active scanning is allowed, and only when the UE is connected to the eNB.

Example 17 includes the subject matter of any one of Examples 13-16, and optionally, wherein the regulatory information comprises an indication of one or more WLAN channels within the WLAN frequency band to which the regulatory restrictions are to be applied.

Example 18 includes the subject matter of any one of Examples 13-17, and optionally, wherein the regulatory information comprises at least first channel information to identify one or more first WLAN channels within the WLAN frequency band, first regulatory information indicating first regulatory restrictions to be applied to the one or more first WLAN channels, second channel information to identify one or more second WLAN channels within the WLAN frequency band, and second regulatory information indicating second regulatory restrictions to be applied to the one or more second WLAN channels.

Example 19 includes the subject matter of any one of Examples 13-18, and optionally, wherein the regulatory information comprises an indication of a Transmit (Tx) power limitation, the apparatus configured to control a Tx power of the UE over the WLAN frequency band based on the Tx power limitation.

Example 20 includes the subject matter of any one of Examples 13-19, and optionally, wherein the regulatory information comprises an indication of a Radio-Frequency (RF) energy emission limitation in a spectral range, the apparatus configured to control the UE based on the RF energy emission limitation.

Example 21 includes the subject matter of any one of Examples 13-20, and optionally, wherein the cellular message comprises a Radio Resource Control (RRC) message addressed to the UE.

Example 22 includes the subject matter of any one of Examples 13-20, and optionally, wherein the cellular message comprises a broadcast message.

Example 23 includes the subject matter of any one of Examples 13-22, and optionally, wherein the at least one WLAN frequency band comprises at least a 5 Gigahertz (GHz) frequency band.

Example 24 includes the subject matter of any one of Examples 13-23, and optionally, comprising one or more antennas, a memory and a processor.

Example 25 includes a system of cellular communication comprising a User Equipment (UE), the UE comprising one or more antennas; a memory; a processor; a Wireless Local Area Network (WLAN) transceiver; a cellular transceiver to receive from an Evolved Node B (eNB) a cellular message comprising regulatory information indicating one or more regulatory restrictions corresponding to WLAN communications over at least one WLAN frequency band, the regulatory information comprising at least an indication on whether or not WLAN active scanning is allowed over the WLAN frequency band; and a controller component configured to, based on the regulatory information, enable or disable the WLAN transceiver to perform a WLAN active scan over the WLAN frequency band.

Example 26 includes the subject matter of Example 25, and optionally, wherein the controller component is configured to disable the WLAN transceiver to perform a WLAN active scan over the WLAN frequency band, when the regulatory information indicates that only WLAN passive scanning is allowed.

Example 27 includes the subject matter of Example 25 or 26, and optionally, wherein the controller component is configured to enable the WLAN transceiver to perform a WLAN active scan over the WLAN frequency band, when the regulatory information indicates that WLAN active scanning is allowed.

Example 28 includes the subject matter of any one of Examples 25-27, and optionally, wherein the controller component is configured to enable the WLAN transceiver to perform a WLAN active scan over the WEAN frequency band, when the regulatory information indicates that WLAN active scanning is allowed, and only when the UE is connected to the eNB.

Example 29 includes the subject matter of any one of Examples 25-28, and optionally, wherein the regulatory information comprises an indication of one or more WLAN channels within the WLAN frequency band to which the regulatory restrictions are to be applied.

Example 30 includes the subject matter of any one of Examples 25-29, and optionally, wherein the regulatory information comprises at least first channel information to identify one or more first WLAN channels within the WLAN frequency band, first regulatory information indicating first regulatory restrictions to be applied to the one or more first WLAN channels, second channel information to identify one or more second WLAN channels within the WLAN frequency band, and second regulatory information indicating second regulatory restrictions to be applied to the one or more second WLAN channels.

Example 31 includes the subject matter of any one of Examples 25-30, and optionally, wherein the regulatory information comprises an indication of a Transmit (Tx) power limitation, the controller component configured to control a Tx power of the WLAN transceiver over the WLAN frequency band based on the Tx power limitation.

Example 32 includes the subject matter of any one of Examples 25-31, and optionally, wherein the regulatory information comprises an indication of a Radio-Frequency (RF) energy emission limitation in a spectral range, the controller component configured to control the WLAN transceiver based on the RF energy emission limitation.

Example 33 includes the subject matter of any one of Examples 25-32, and optionally, wherein the cellular message comprises a Radio Resource Control (RRC) message addressed to the UE.

Example 34 includes the subject matter of any one of Examples 25-32, and optionally, wherein the cellular message comprises a broadcast message.

Example 35 includes the subject matter of any one of Examples 25-34, and optionally, wherein the at least one WLAN frequency band comprises at least a 5 Gigahertz (GHz) frequency band.

Example 36 includes a product comprising one or more tangible computer-readable storage media comprising computer-executable instructions operable to, when executed by at least one computer processor, enable the at least one computer processor to implement one or more operations at a User Equipment (UE), the operations comprising processing a cellular message from an Evolved Node B (eNB), the cellular message comprising regulatory information indicating one or more regulatory restrictions corresponding to WLAN communications over at least one WLAN frequency band, the regulatory information comprising at least an indication on whether or not WLAN active scanning is allowed over the WLAN frequency band; and based on the regulatory information, enabling or disabling the UE to perform a WLAN active scan over the WLAN frequency band.

Example 37 includes the subject matter of Example 36, and optionally, wherein the operations comprise disabling the UE to perform a WLAN active scan over the WLAN frequency band, when the regulatory information indicates that only WLAN passive scanning is allowed.

Example 38 includes the subject matter of Example 36 or 37, and optionally, wherein the operations comprise enabling the UE to perform a WLAN active scan over the WLAN frequency band, when the regulatory information indicates that WLAN active scanning is allowed.

Example 39 includes the subject matter of any one of Examples 36-38, and optionally, wherein the operations comprise enabling the UE to perform a WLAN active scan over the WLAN frequency band, when the regulatory information indicates that WLAN active scanning is allowed, and only when the UE is connected to the eNB.

Example 40 includes the subject matter of any one of Examples 36-39, and optionally, wherein the regulatory information comprises an indication of one or more WLAN channels within the WLAN frequency band to which the regulatory restrictions are to be applied.

Example 41 includes the subject matter of any one of Examples 36-40, and optionally, wherein the regulatory information comprises at least first channel information to identify one or more first WLAN channels within the WLAN frequency band, first regulatory information indicating first regulatory restrictions to be applied to the one or more first WLAN channels, second channel information to identify one or more second WLAN channels within the WLAN frequency band, and second regulatory information indicating second regulatory restrictions to be applied to the one or more second WLAN channels.

Example 42 includes the subject matter of any one of Examples 36-41, and optionally, wherein the regulatory information Comprises an indication of a Transmit (Tx) power limitation, wherein the operations comprise controlling a Tx power of the UE over the WLAN frequency band based on the Tx power limitation.

Example 43 includes the subject matter of any one of Examples 36-42, and optionally, wherein the regulatory information comprises an indication of a Radio-Frequency (RF) energy emission limitation in a spectral range, wherein the operations comprise controlling the UE based on the RF energy emission limitation.

Example 44 includes the subject matter of any one of Examples 36-43, and optionally, wherein the cellular message comprises a Radio Resource Control (RRC) message addressed to the UE.

Example 45 includes the subject matter of any one of Examples 36-43, and optionally, wherein the cellular message comprises a broadcast message.

Example 46 includes the subject matter of any one of Examples 36-45, and optionally, wherein the at least one WLAN frequency band comprises at least a 5 Gigahertz (GHz) frequency band.

Example 47 includes a method to be performed by a User Equipment (UE), the method comprising processing a cellular message from an Evolved Node B (eNB), the cellular message comprising regulatory information indicating one or more regulatory restrictions corresponding to WLAN communications over at least one WLAN frequency band, the regulatory information comprising at least an indication on whether or not WLAN active scanning is allowed over the WLAN frequency band; and based on the regulatory information, enabling or disabling the UE to perform a WLAN active scan over the WLAN frequency band.

Example 48 includes the subject matter of Example 47, and optionally, comprising disabling the UE to perform a WLAN active scan over the WLAN frequency band, when the regulatory information indicates that only WLAN passive scanning is allowed.

Example 49 includes the subject matter of Example 47 or 48, and optionally, comprising enabling the UE to perform a WLAN active scan over the WLAN frequency band, when the regulatory information indicates that WLAN active scanning is allowed.

Example 50 includes the subject matter of any one of Examples 47-49, and optionally, comprising enabling the UE to perform a WLAN active scan over the WLAN frequency band, when the regulatory information indicates that WLAN active scanning is allowed, and only when the UE is connected to the eNB.

Example 51 includes the subject matter of any one of Examples 47-50, and optionally, wherein the regulatory information comprises an indication of one or more WLAN channels within the WLAN frequency band to which the regulatory restrictions are to be applied.

Example 52 includes the subject matter of any one of Examples 47-51, and optionally, wherein the regulatory information comprises at least first channel information to identify one or more first WLAN channels within the WLAN frequency band, first regulatory information indicating first regulatory restrictions to be applied to the one or more first WLAN channels, second channel information to identify one or more second WLAN channels within the WLAN frequency band, and second regulatory information indicating second regulatory restrictions to be applied to the one or more second WLAN channels.

Example 53 includes the subject matter of any one of Examples 47-52, and optionally, wherein the regulatory information comprises an indication of a Transmit (Tx) power limitation, comprising controlling a Tx power of the UE over the WLAN frequency band based on the Tx power limitation.

Example 54 includes the subject matter of any one of Examples 47-53, and optionally, wherein the regulatory information comprises an indication of a Radio-Frequency (RF) energy emission limitation in a spectral range, comprising controlling the UE based on the RF energy emission limitation.

Example 55 includes the subject matter of any one of Examples 47-54, and optionally, wherein the cellular message comprises a Radio Resource Control (RRC) message addressed to the UE.

Example 56 includes the subject matter of any one of Examples 47-54, and optionally, wherein the cellular message comprises a broadcast message.

Example 57 includes the subject matter of any one of Examples 47-56, and optionally, wherein the at least one WLAN frequency band comprises at least a 5 Gigahertz (GHz) frequency band.

Example 58 includes an apparatus of a User Equipment (UE), the apparatus comprising means for processing a cellular message from an Evolved Node B (eNB), the cellular message comprising regulatory information indicating one or more regulatory restrictions corresponding to WLAN communications over at least one WLAN frequency band, the regulatory information comprising at least an indication on whether or not WLAN active scanning is allowed over the WLAN frequency band; and means for, based on the regulatory information, enabling or disabling the UE to perform a WLAN active scan over the WLAN frequency band.

Example 59 includes the subject matter of Example 58, and optionally, comprising means for disabling the UE to perform a WLAN active scan over the WLAN frequency band, when the regulatory information indicates that only WLAN passive scanning is allowed.

Example 60 includes the subject matter of Example 58 or 59, and optionally, comprising means for enabling the UE to perform a WLAN active scan over the WLAN frequency band, when the regulatory information indicates that WLAN active scanning is allowed.

Example 61 includes the subject matter of any one of Examples 58-60, and optionally, comprising means for enabling the UE to perform a WLAN active scan over the WLAN frequency band, when the regulatory information indicates that WLAN active scanning is allowed, and only when the UE is connected to the eNB.

Example 62 includes the subject matter of any one of Examples 58-61, and optionally, wherein the regulatory information comprises an indication of one or more WLAN channels within the WLAN frequency band to which the regulatory restrictions are to be applied.

Example 63 includes the subject matter of any one of Examples 58-62, and optionally, wherein the regulatory information comprises at least first channel information to identify one or more first WLAN channels within the WLAN frequency band, first regulatory information indicating first regulatory restrictions to be applied to the one or more first WLAN channels, second channel information to identify one or more second WLAN channels within the WLAN frequency band, and second regulatory information indicating second regulatory restrictions to be applied to the one or more second WLAN channels.

Example 64 includes the subject matter of any one of Examples 58-63, and optionally, wherein the regulatory information comprises an indication of a Transmit (Tx) power limitation, comprising controlling a Tx power of the UE over the WLAN frequency band based on the Tx power limitation.

Example 65 includes the subject matter of any one of Examples 58-64, and optionally, wherein the regulatory information comprises an indication of a Radio-Frequency (RF) energy emission limitation in a spectral range, comprising controlling the UE based on the RF energy emission limitation.

Example 66 includes the subject matter of any one of Examples 58-65, and optionally, wherein the cellular message comprises a Radio Resource Control (RRC) message addressed to the UE.

Example 67 includes the subject matter of any one of Examples 58-65, and optionally, wherein the cellular message comprises a broadcast message.

Example 68 includes the subject matter of any one of Examples 58-67, and optionally, wherein the at least one WLAN frequency band comprises at least a 5 Gigahertz (GHz) frequency band.

Example 69 includes an apparatus of an Evolved Node B (eNB), the apparatus comprising a message processor configured to generate a cellular message comprising regulatory information indicating one or more regulatory restrictions corresponding to WLAN communications over at least one WLAN frequency band, the regulatory information comprising at least an indication on whether or not WLAN active scanning is allowed over the WLAN frequency band; and a cellular interface configured to send the cellular message to a User Equipment (UE) via a cellular link.

Example 70 includes the subject matter of Example 69, and optionally, comprising a WLAN control interface to communicate with at least one WLAN Termination (WT) node, the regulatory information is based on at least one message from the WT node.

Example 71 includes the subject matter of Example 69 or 70, and optionally, wherein the regulatory information comprises an indication of one or more WLAN channels within the WLAN frequency band to which the regulatory restrictions are to be applied.

Example 72 includes the subject matter of any one of Examples 69-71, and optionally, wherein the regulatory information comprises at least first channel information to identify one or more first WLAN channels within the WLAN frequency band, first regulatory information indicating first regulatory restrictions to be applied to the one or more first WLAN channels, second channel information to identify one or more second WLAN channels within the WLAN frequency band, and second regulatory information indicating second regulatory restrictions to be applied to the one or more second WLAN channels.

Example 73 includes the subject matter of any one of Examples 69-72, and optionally, wherein the regulatory information comprises an indication of a Transmit (Tx) power limitation over the WLAN frequency band.

Example 74 includes the subject matter of any one of Examples 69-73, and optionally, wherein the regulatory information comprises an indication of a Radio-Frequency (RF) energy emission limitation in a spectral range.

Example 75 includes the subject matter of any one of Examples 69-74, and optionally, wherein the cellular message comprises a Radio Resource Control (RRC) message addressed to the UE.

Example 76 includes the subject matter of any one of Examples 69-74, and optionally, wherein the cellular message comprises a broadcast message.

Example 77 includes the subject matter of any one of Examples 69-76, and optionally, wherein the at least one WLAN frequency band comprises at least a 5 Gigahertz (GHz) frequency band.

Example 78 includes the subject matter of any one of Examples 69-77, and optionally, comprising one or more antennas, a memory and a processor.

Example 79 includes an apparatus comprising circuitry and logic configured to trigger an Evolved Node B (eNB) to generate a cellular message comprising regulatory information indicating one or more regulatory restrictions corresponding to WLAN communications over at least one WLAN frequency band, the regulatory information comprising at least an indication on whether or not WLAN active scanning is allowed over the WLAN frequency band; and send the cellular message to a User Equipment (UE) via a cellular link.

Example 80 includes the subject matter of Example 79, and optionally, wherein the eNB is configured to communicate with at least one WLAN Termination (WT) node, the regulatory information is based on at least one message from the WT node.

Example 81 includes the subject matter of Example 79 or 80, and optionally, wherein the regulatory information comprises an indication of one or more WLAN channels within the WLAN frequency band to which the regulatory restrictions are to be applied.

Example 82 includes the subject matter of any one of Examples 79-81, and optionally, wherein the regulatory information comprises at least first channel information to identify one or more first WLAN channels within the WLAN frequency band, first regulatory information indicating first regulatory restrictions to be applied to the one or more first WLAN channels, second channel information to identify one or more second WLAN channels within the WLAN frequency band, and second regulatory information indicating second regulatory restrictions to be applied to the one or more second WLAN channels.

Example 83 includes the subject matter of any one of Examples 79-82, and optionally, wherein the regulatory information comprises an indication of a Transmit (Tx) power limitation over the WLAN frequency band.

Example 84 includes the subject matter of any one of Examples 79-83, and optionally, wherein the regulatory information comprises an indication of a Radio-Frequency (RF) energy emission limitation in a spectral range.

Example 85 includes the subject matter of any one of Examples 79-84, and optionally, wherein the cellular message comprises a Radio Resource Control (RRC) message addressed to the UE.

Example 86 includes the subject matter of any one of Examples 79-84, and optionally, wherein the cellular message comprises a broadcast message.

Example 87 includes the subject matter of any one of Examples 79-86, and optionally, wherein the at least one WLAN frequency band comprises at least a 5 Gigahertz (GHz) frequency band.

Example 88 includes the subject matter of any one of Examples 79-87, and optionally, wherein the eNB comprises one or more antennas, a memory and a processor.

Example 89 includes a system of cellular communication comprising an Evolved Node B (eNB), the eNB comprising one or more antennas; a memory; a processor; a message processor configured to generate a cellular message comprising regulatory information indicating one or more regulatory restrictions corresponding to WLAN communications over at least one WLAN frequency band, the regulatory information comprising at least an indication on whether or not WLAN active scanning is allowed over the WLAN frequency band; and a cellular interface configured to send the cellular message to a User Equipment (UE) via a cellular link.

Example 90 includes the subject matter of Example 89, and optionally, wherein the eNB comprises a WLAN control interface to communicate with at least one WLAN Termination (WT) node, the regulatory information is based on at least one message from the WT node.

Example 91 includes the subject matter of Example 89 or 90, and optionally, wherein the regulatory information comprises an indication of one or more WLAN channels within the WLAN frequency band to which the regulatory restrictions are to be applied.

Example 92 includes the subject matter of any one of Examples 89-91, and optionally, wherein the regulatory information comprises at least first channel information to identify one or more first WLAN channels within the WLAN frequency band, first regulatory information indicating first regulatory restrictions to be applied to the one or more first WLAN channels, second channel information to identify one or more second WLAN channels within the WLAN frequency band, and second regulatory information indicating second regulatory restrictions to be applied to the one or more second WLAN channels.

Example 93 includes the subject matter of any one of Examples 89-92, and optionally, wherein the regulatory information comprises an indication of a Transmit (Tx) power limitation over the WLAN frequency band.

Example 94 includes the subject matter of any one of Examples 89-93, and optionally, wherein the regulatory information comprises an indication of a Radio-Frequency (RF) energy emission limitation in a spectral range.

Example 95 includes the subject matter of any one of Examples 89-94, and optionally, wherein the cellular message comprises a Radio Resource Control (RRC) message addressed to the UE.

Example 96 includes the subject matter of any one of Examples 89-94, and optionally, wherein the cellular message comprises a broadcast message.

Example 97 includes the subject matter of any one of Examples 89-96, and optionally, wherein the at least one WLAN frequency band comprises at least a 5 Gigahertz (GHz) frequency band.

Example 98 includes a product comprising one or more tangible computer-readable storage media comprising computer-executable instructions operable to, when executed by at least one computer processor, enable the at least one computer processor to implement one or more operations at an Evolved Node B (eNB), the operations comprising generating a cellular message comprising regulatory information indicating one or more regulatory restrictions corresponding to WLAN communications over at least one WLAN frequency band, the regulatory information comprising at least an indication on whether or not WLAN active scanning is allowed over the WLAN frequency band; and sending the cellular message to a User Equipment (UE) via a cellular link.

Example 99 includes the subject matter of Example 98, and optionally, wherein the operations comprise communicating with at leak one WLAN Termination (WT) node, the regulatory information is based on at least one message from the WT node.

Example 100 includes the subject matter of Example 98 or 99, and optionally, wherein the regulatory information comprises an indication of one or more WLAN channels within the WLAN frequency band to which the regulatory restrictions are to be applied.

Example 101 includes the subject matter of any one of Examples 98-100, and optionally, wherein the regulatory information comprises at least first channel information to identify one or more first WLAN channels within the WLAN frequency band, first regulatory information indicating first regulatory restrictions to be applied to the one or more first WLAN channels, second channel information to identify one or more second WLAN channels within the WLAN frequency band, and second regulatory information indicating second regulatory restrictions to be applied to the one or more second WLAN channels.

Example 102 includes the subject matter of any one of Examples 98-101, and optionally, wherein the regulatory information comprises an indication of a Transmit (Tx) power limitation over the WLAN frequency band.

Example 103 includes the subject matter of any one of Examples 98-102, and optionally, wherein the regulatory information comprises an indication of a Radio-Frequency (RF) energy emission limitation in a spectral range.

Example 104 includes the subject matter of any one of Examples 98-103, and optionally, wherein the cellular message comprises a Radio Resource Control (RRC) message addressed to the UE.

Example 105 includes the subject matter of any one of Examples 98-103, and optionally, wherein the cellular message comprises a broadcast message.

Example 106 includes the subject matter of any one of Examples 98-105, and optionally, wherein the at least one WLAN frequency band comprises at least a 5 Gigahertz (GHz) frequency band.

Example 107 includes a method to be performed at an Evolved Node B (eNB), the method comprising generating a cellular message comprising regulatory information indicating one or more regulatory restrictions corresponding to WLAN communications over at least one WLAN frequency band, the regulatory information comprising at least an indication on whether or not WLAN active scanning is allowed over the WLAN frequency band; and sending the cellular message to a User Equipment (UE) via a cellular link.

Example 108 includes the subject matter of Example 107, and optionally, comprising communicating with at least one WLAN Termination (WT) node, the regulatory information is based on at least one message from the WT node.

Example 109 includes the subject matter of Example 107 or 108, and optionally, wherein the regulatory information comprises an indication of one or more WLAN channels within the WLAN frequency band to which the regulatory restrictions are to be applied.

Example 110 includes the subject matter of any one of Examples 107-109, and optionally, wherein the regulatory information comprises at least first channel information to identify one or more first WLAN channels within the WLAN frequency band, first regulatory information indicating first regulatory restrictions to be applied to the one or more first WLAN channels, second channel information to identify one or more second WLAN channels within the WLAN frequency band, and second regulatory information indicating second regulatory restrictions to be applied to the one or more second WLAN channels.

Example 111 includes the subject matter of any one of Examples 107-110, and optionally, wherein the regulatory information comprises an indication of a Transmit (Tx) power limitation over the WLAN frequency band.

Example 112 includes the subject matter of any one of Examples 107-111, and optionally, wherein the regulatory information comprises an indication of a Radio-Frequency (RF) energy emission limitation in a spectral range.

Example 113 includes the subject matter of any one of Examples 107-112, and optionally, wherein the cellular message comprises a Radio Resource Control (RRC) message addressed to the UE.

Example 114 includes the subject matter of any one of Examples 107-112, and optionally, wherein the cellular message comprises a broadcast message.

Example 115 includes the subject matter of any one of Examples 107-114, and optionally, wherein the at least one WLAN frequency band comprises at least a 5 Gigahertz (GHz) frequency band.

Example 116 includes an apparatus of an Evolved Node B (eNB), the apparatus comprising means for generating a cellular message comprising regulatory information indicating one or more regulatory restrictions corresponding to WLAN communications over at least one WLAN frequency band, the regulatory information comprising at least an indication on whether or not WLAN active scanning is allowed over the WLAN frequency band; and means for sending the cellular message to a User Equipment (UE) via a cellular link.

Example 117 includes the subject matter of Example 116, and optionally, comprising means for communicating with at least one WLAN Termination (WT) node, the regulatory information is based on at least one message from the WT node.

Example 118 includes the subject matter of Example 116 or 117, and optionally, wherein the regulatory information comprises an indication of one or more WLAN channels within the WLAN frequency band to which the regulatory restrictions are to be applied.

Example 119 includes the subject matter of any one of Examples 116-118, and optionally, wherein the regulatory information comprises at least first channel information to identify one or more first WLAN channels within the WLAN frequency band, first regulatory information indicating first regulatory restrictions to be applied to the one or more first WLAN channels, second channel information to identify one or more second WLAN channels within the WLAN frequency band, and second regulatory information indicating second regulatory restrictions to be applied to the one or more second WLAN channels.

Example 120 includes the subject matter of any one of Examples 116-119, and optionally, wherein the regulatory information comprises an indication of a Transmit (Tx) power limitation over the WLAN frequency band.

Example 121 includes the subject matter of any one of Examples 116-120, and optionally, wherein the regulatory information comprises an indication of a Radio-Frequency (RF) energy emission limitation in a spectral range.

Example 122 includes the subject matter of any one of Examples 116-121, and optionally, wherein the cellular message comprises a Radio Resource Control (RRC) message addressed to the UE.

Example 123 includes the subject matter of any one of Examples 116-121, and optionally, wherein the cellular message comprises a broadcast message.

Example 124 includes the subject matter of any one of Examples 116-123, and optionally, wherein the at least one WLAN frequency band comprises at least a 5 Gigahertz (GHz) frequency band.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus of a User Equipment (UE), the apparatus comprising:

a Wireless Local Area Network (WLAN) transceiver;

a cellular transceiver to receive from an Evolved Node B (eNB) a cellular message comprising an Information Element (IE) comprising regulatory information indicating one or more regulatory restrictions corresponding to WLAN communications over at least one WLAN frequency band, the IE comprising first WLAN channel information to identify one or more first WLAN channels within the WLAN frequency band, first regulatory information indicating first regulatory restrictions to be applied to the one or more first WLAN channels, second WLAN channel information to identify one or more second WLAN channels within the WLAN frequency band, and second regulatory information indicating second regulatory restrictions to be applied to the one or more second WLAN channels, wherein the first regulatory information comprises a scanning indicator field comprising a passive-scanning-only indicator or an active-scanning-allowed indicator, the passive-scanning-only indicator to indicate that only WLAN passive scanning is allowed over the one or more first WLAN channels, the active-scanning-allowed indicator to indicate that WLAN active scanning is allowed over the one or more first WLAN channels; and a controller configured to, based on the scanning indicator field, enable or disable said WLAN transceiver to perform a WLAN active scan over the one or more first WLAN channels in the WLAN frequency band.

2. The apparatus of claim 1, wherein the controller is configured to disable the WLAN transceiver to perform the WLAN active scan over the one or more first WLAN channels in the WLAN frequency band, when the scanning indicator field indicates that only WLAN passive scanning is allowed over the one or more first WLAN channels.

3. The apparatus of claim 1, wherein the controller is configured to enable the WLAN transceiver to perform the WLAN active scan over the one or more first WLAN channels in the WLAN frequency band, when the scanning indicator field indicates that WLAN active scanning is allowed over the one or more first WLAN channels.

4. The apparatus of claim 1, wherein the controller is configured to enable the WLAN transceiver to perform the WLAN active scan over the one or more first WLAN channels in the WLAN frequency band, when the scanning indicator field indicates that WLAN active scanning is allowed over the one or more first WLAN channels, and only when the UE is connected to the eNB.

5. The apparatus of claim 1, wherein the first WLAN channel information comprises a list of the one or more WLAN channels.

6. The apparatus of claim 1, wherein the first regulatory information comprises a first scanning indicator field and the second regulatory information comprises a second scanning indicator field, the second scanning indicator field comprising the passive-scanning-only indicator or the active-scanning-allowed indicator, and wherein the controller is configured to, based on the second scanning indicator field, enable or disable said WLAN transceiver to perform the WLAN active scan over the one or more second WLAN channels in the WLAN frequency band.

7. The apparatus of claim 1, wherein the IE comprises an indication of a Transmit (Tx) power limitation, the controller configured to control a Tx power of the WLAN transceiver over the WLAN frequency band based on the Tx power limitation.

8. The apparatus of claim 1, wherein the IE comprises an indication of a Radio-Frequency (RF) energy emission limitation in a spectral range, the controller configured to control the WLAN transceiver based on the RF energy emission limitation.

9. The apparatus of claim 1, wherein the cellular message comprises a Radio Resource Control (RRC) message addressed to the UE.

10. The apparatus of claim 1, wherein the at least one WLAN frequency band comprises at least a 5 Gigahertz (GHz) frequency band.

11. The apparatus of claim 1 comprising one or more antennas, a memory and a processor.

12. A product comprising one or more tangible computer-readable non-transitory storage media comprising computer-executable instructions operable to, when executed by at least one processor, enable the at least one processor to cause a User Equipment (UE) to:
 process a cellular message from an Evolved Node B (eNB), the cellular message comprising an Information Element (IE) comprising regulatory information indicating one or more regulatory restrictions corresponding to WLAN communications over at least one WLAN frequency band, the IE comprising the first WLAN channel information to identify one or more first WLAN channels within the WLAN frequency band, first regulatory information indicating first regulatory restrictions to be applied to the one or more first WLAN channels, second WLAN channel information to identify one or more second WLAN channels within the WLAN frequency band, and second regulatory information indicating second regulator, restrictions to be applied to the one or more second WLAN channels, wherein the first regulatory information comprises a scanning indicator field comprising a passive-scanning-only indicator or an active-scanning-allowed indicator, the passive-scanning-only indicator to indicate that only WLAN passive scanning is allowed over the one or more first WLAN channels, the active-scanning-allowed indicator to indicate that WLAN active scanning is allowed over the one or more first WLAN channels; and
 based on the scanning indicator field, enable or disable said UE to perform a WLAN active scan over the one or more first WLAN channels in the WLAN frequency band.

13. The product of claim 12, wherein the instructions, when executed, cause the UE to disable the UE to perform the WLAN active scan over the one or more first WLAN channels in the WLAN frequency band, when the scanning indicator field indicates that only WLAN passive scanning is allowed over the one or more first WLAN channels, and to enable the UE to perform the WLAN active scan over the one or more first WLAN channels in the WLAN frequency band, when the scanning indicator field indicates that WLAN active scanning is allowed over the one or more WLAN channels.

14. The product of claim 12, wherein the IE comprises an indication of a Transmit (Tx) power limitation, wherein the instructions, when executed, cause the UE to control a Tx power of the UE over the WLAN frequency band based on the Tx power limitation.

15. An apparatus of an Evolved Node B (eNB), the apparatus comprising:
 a message processor configured to generate a cellular message comprising an Information Element (IE) comprising regulatory information indicating one or more regulatory restrictions corresponding to WLAN communications over at least one WLAN frequency band, the IE comprising first WLAN channel information to identify one or more first WLAN channels within the WLAN frequency band, first regulatory information indicating first regulatory restrictions to be applied to the one or more first WLAN channels, second WLAN channel information to identify one or more second WLAN channels within the WLAN frequency band, and second regulatory information indicating second regulatory restrictions to be applied to the one or more second WLAN channels, wherein the first regulatory information comprises a scanning indicator field comprising a passive-scanning-only indicator or an active-scanning-allowed indicator, the passive-scanning-only indicator to indicate that only WLAN passive scanning is allowed over the one or more first WLAN channels, the active-scanning-allowed indicator to indicate that WLAN active scanning is allowed over the one or more first WLAN channels; and
 a cellular interface configured to send the cellular message to a User Equipment (UE) via a cellular link.

16. The apparatus of claim 15 comprising a WLAN control interface to communicate with at least one WLAN Termination (WT) node, the regulatory information is based on at least one message from the WT node.

17. The apparatus of claim 15, wherein the first WLAN channel information comprises a list of the one or more first WLAN channels.

18. The apparatus of claim 15, wherein the message processor is configured to selectively set the scanning indicator field to include the passive-scanning-only indicator or the active-scanning-allowed indicator, based on whether or not the WLAN active scanning is allowed over the one or more first WLAN channels.

19. The apparatus of claim 15, wherein the IE comprises an indication of a Transmit (Tx) power limitation over the WLAN frequency band.

20. The apparatus of claim 15, wherein the IE comprises an indication of a Radio-Frequency (RF) energy emission limitation in a spectral range.

21. The apparatus of claim 15, wherein the cellular message comprises a Radio Resource Control (RRC) message addressed to the UE.

22. The apparatus of claim 15 comprising one or more antennas, a memory and a processor.

23. A product comprising one or more tangible computer-readable non-transitory storage media comprising computer-executable instructions operable to, when executed by at least one processor, enable the at least one processor to cause an Evolved Node B (eNB) to:

generate a cellular message comprising an Information Element (IE) comprising regulatory information indicating one or more regulatory restrictions corresponding to WLAN communications over at least one WLAN frequency band, the IE comprising first WLAN channel information to identify one or more first WLAN channels within the WLAN frequency band, first regulatory information indicating first regulatory restrictions to be applied to the one or more first WLAN channels, second WLAN channel information to identify one or more second WLAN channels within the WLAN frequency band, and second regulatory information indicating second regulatory restrictions to be applied to the one or more second WLAN channels, wherein the first regulatory information comprises a scanning indicator field comprising a passive-scanning-only indicator or an active-scanning-allowed indicator, the passive-scanning-only indicator to indicate that only WLAN passive scanning is allowed over the one or more first WLAN channels, the active-scanning-allowed indicator to indicate that WLAN active scanning is allowed over the one or more first WLAN channels; and send the cellular message to a User Equipment (UE) via a cellular link.

24. The product of claim 23, wherein the instructions, when executed, cause the eNB to communicate with at least one WLAN Termination (WT) node, the regulatory information is based on at least one message from the WT node.

25. The product of claim 23, wherein the instructions, when executed, cause the eNB to selectively set the scanning indicator field to include the passive-scanning-only indicator or the active-scanning-allowed indicator, based on whether or not the WLAN active scanning is allowed over the one or more first WLAN channels.

* * * * *